(12) United States Patent
Sakai

(10) Patent No.: US 11,258,913 B2
(45) Date of Patent: Feb. 22, 2022

(54) MEDIUM CONVEYING APPARATUS FOR ESTIMATING A SHAPE OF A CONVEYED MEDIUM BASED ON A LINE IMAGE ACQUIRED BY IMAGING A SELECTED SURFACE

(71) Applicant: PFU LIMITED, Kahoku (JP)

(72) Inventor: Masaaki Sakai, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 16/985,033

(22) Filed: Aug. 4, 2020

(65) Prior Publication Data

US 2021/0084181 A1    Mar. 18, 2021

(30) Foreign Application Priority Data

Sep. 13, 2019  (JP) .............................. JP2019-167494

(51) Int. Cl.
*H04N 1/00*  (2006.01)

(52) U.S. Cl.
CPC ..... *H04N 1/00748* (2013.01); *H04N 1/00602* (2013.01); *H04N 1/00644* (2013.01); *H04N 1/00737* (2013.01)

(58) Field of Classification Search
CPC ........... H04N 1/00748; H04N 1/00602; H04N 1/00644; H04N 1/00737; H04N 1/00559; H04N 1/00572; H04N 1/00578; H04N 1/00588; H04N 1/00604; H04N 1/00612; H04N 1/00628; H04N 1/00631; H04N 1/00641; H04N 1/00649; H04N 1/0083; H04N 1/12; H04N 1/193; H04N 2201/0091; B65H 2301/133; B65H 2301/33312; B65H 2405/3321; B65H 29/125; B65H 85/00; G03G 15/231
USPC .......................................................... 358/474
See application file for complete search history.

(56) References Cited

U.S. PATENT DOCUMENTS

| 7,230,225 | B2 * | 6/2007 | Tanimoto ............... H04N 1/486 250/208.1 |
| 2009/0009825 | A1 | 1/2009 | Honda |
| 2010/0061655 | A1 * | 3/2010 | Ma ......................... G06T 5/002 382/275 |
| 2014/0146196 | A1 * | 5/2014 | Shoda ................ H04N 5/36961 348/222.1 |

(Continued)

FOREIGN PATENT DOCUMENTS

JP          2009-17409 A      1/2009

*Primary Examiner* — Negussie Worku
(74) *Attorney, Agent, or Firm* — Lewis Roca Rothgerber Christie LLP

(57) ABSTRACT

A medium conveying apparatus includes a processor to detect edge pixel from a first line image and a second line image, select a first surface or a second surface of the medium, based on the number of the detected edge pixels, a comparison between a gradation value of each of the detected edge pixels and a gradation value of a peripheral pixel of each of the detected edge pixels, or a variation of gradation values of pixels within a predetermined distance from each of the detected edge pixels or the peripheral pixel of each of the detected edge pixels, estimate a shape of the medium based on a line image acquired by imaging the selected surface, and control a conveying roller or cut out a medium image from the first line image and the second line image and output the medium image, based on the estimated shape.

18 Claims, 21 Drawing Sheets

(56) References Cited

U.S. PATENT DOCUMENTS

| | | | |
|---|---|---|---|
| 2015/0319335 A1* | 11/2015 | Baba | H04N 1/047 |
| | | | 358/447 |
| 2016/0086031 A1* | 3/2016 | Shigeno | G06K 9/00624 |
| | | | 382/103 |
| 2017/0093417 A1* | 3/2017 | Iwashita | G06F 13/4256 |
| 2017/0257495 A1* | 9/2017 | Kanaya | H04N 1/00615 |
| 2018/0211106 A1* | 7/2018 | Kamada | G06K 9/00449 |
| 2018/0376028 A1* | 12/2018 | Kanaya | H04N 1/00037 |
| 2020/0252513 A1* | 8/2020 | Nakada | H04N 1/00779 |
| 2021/0067650 A1* | 3/2021 | Kanai | H04N 1/00602 |

* cited by examiner

MEDIUM CONVEYING APPARATUS FOR ESTIMATING A SHAPE OF A CONVEYED MEDIUM BASED ON A LINE IMAGE ACQUIRED BY IMAGING A SELECTED SURFACE

CROSS-REFERENCE TO RELATED APPLICATIONS

This application is based upon and claims the benefit of priority of prior Japanese Patent Application No. 2019-167494, filed on Sep. 13, 2019, the entire contents of which are incorporated herein by reference.

TECHNICAL FIELD

Embodiments discussed in the present specification relate to medium conveyance.

BACKGROUND

A medium conveying apparatus such as a scanner that conveys a medium such as a document and reads an image of the conveyed medium has a function of detecting whether or not multi-feed in which a plurality of media are conveyed in an overlapped manner has occurred. In general, the medium conveying app includes an ultrasonic transmitter for transmitting an ultrasonic wave and an ultrasonic receiver for outputting a signal corresponding to the received ultrasonic wave, and detects multi-feed based on a signal output by the ultrasonic receiver when the medium is conveyed. However, the reception level of ultrasonic waves when plastic-made card is conveyed as a medium is close to the reception level of ultrasonic waves when multi-feed of sheets occurs. Therefore, when the card is conveyed, it may be mistakenly determined that multi-feed has occurred. Generally, in order to provide an image that is easy for a user to use, the medium conveying apparatus has a function of cutting out a region including the medium from an image acquired by reading the medium. Therefore, in the medium conveying apparatus, it is desired to suitably estimate a shape of the conveyed medium.

An image reading processing apparatus for detecting a straight line group corresponding to an edge portion of a document in image data acquired by reading both sides of a document and selecting a straight line group suitable for an edge portion of the document from a straight line group on one surface and an inverted straight line group on the other surface, is disclosed (see Japanese Unexamined Patent Publication (Kokai) No. 2009-017409).

SUMMARY

According to some embodiments, a medium conveying apparatus includes a conveying roller to convey a medium, a first imaging device to generate a first line image acquired by imaging a first surface of the medium conveyed by the conveying roller, a second imaging device to generate a second line image acquired by imaging a second surface of the medium conveyed by the conveying roller, and a processor to detect edge pixels from the first line image and the second line image, select the first surface or the second surface of the medium, based on the number of the detected edge pixels, a comparison between a gradation value of each of the detected edge pixels and a gradation value of a peripheral pixel of each of the detected edge pixels, or a variation of gradation values of pixels within a predetermined distance from each of the detected edge pixels or the peripheral pixel of each of the detected edge pixels, estimate a shape of the medium based on a line image acquired by imaging the selected surface, and control the conveying roller or cut out a medium image from the first line image and the second line image and output the medium image, based on the estimated shape.

According to some embodiments, a method for estimating a shape of a medium includes conveying a medium by a conveyance roller, generating a first line image acquired by a first imaging device by imaging a first surface of the medium conveyed by the conveying roller, generating a second line image acquired by a second imaging device by imaging a second surface of the medium conveyed by the conveying roller, detecting edge pixels from the first line image and the second line image, selecting the first surface or the second surface of the medium, based on the number of the detected edge pixels, a comparison between a gradation value of each of the detected edge pixels and a gradation value of a peripheral pixel of each of the detected edge pixels, or a variation of gradation values of pixels within a predetermined distance from the detected edge pixels or the peripheral pixel of each of the detected edge pixels, estimating a shape of the medium based on a line image acquired by imaging the selected surface, and controlling the conveying roller or cutting out a medium image from the first line image and the second line image and outputting the medium image, based on the estimated shape.

According to some embodiments, a computer program causes a medium conveying apparatus including a conveying roller to convey a medium, a first imaging device to generate a first line image acquired by imaging a first surface of the medium conveyed by the conveying roller, and a second imaging device to generate a second line image acquired by imaging a second surface of the medium conveyed by the conveying roller, to execute a process including detecting edge pixels from the first line image and the second line image, selecting the first surface or the second surface of the medium, based on the number of the detected edge pixels, a comparison between a gradation value of each of the detected edge pixels and a gradation value of a peripheral pixel of each of the detected edge pixels, or a variation of gradation values of pixels within a predetermined distance from each of the detected edge pixels or the peripheral pixel of each of the detected edge pixels, estimating a shape of the medium based on a line image acquired by imaging the selected surface, and controlling the conveying roller or cutting out a medium image from the first line image and the second line image and outputting the medium image, based on the estimated shape.

DESCRIPTION OF EMBODIMENTS

It is to be understood that both the foregoing general description and the following detailed description are exemplary and explanatory, and are not restrictive of the invention, as claimed.

Hereinafter, a medium conveying apparatus, a method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
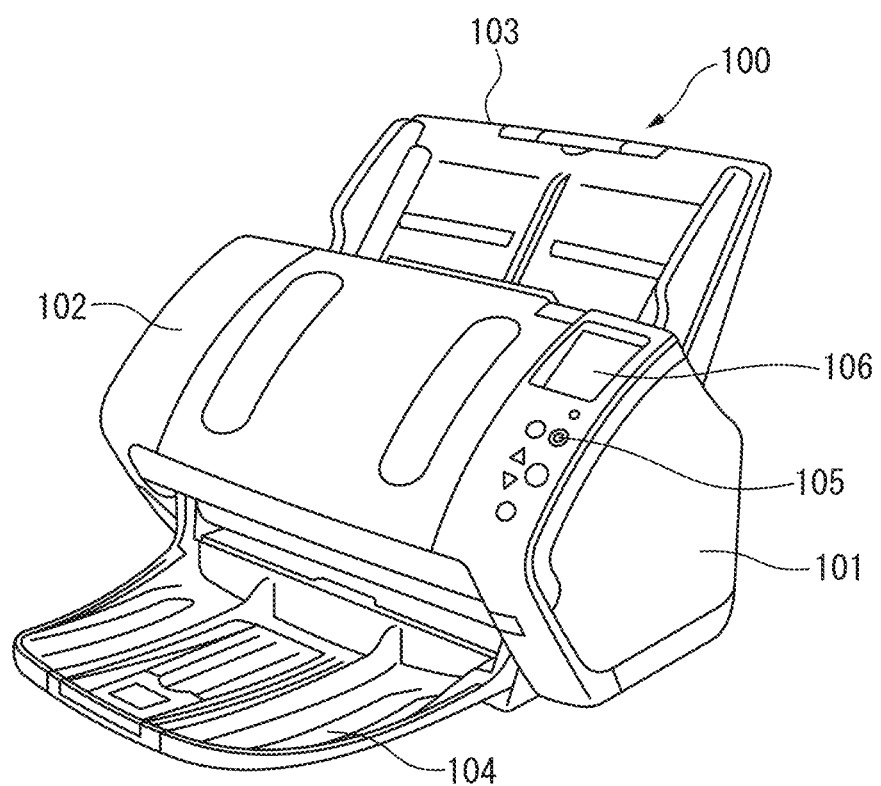
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. A medium is paper, thick paper, a card, a brochure, a passport, etc. For example, a card is a plastic resin card (plastic card). The card is, for example, an identification card having IC (Integrated Circuit) chips or magnetic stripes in which authentication information is stored, or having a user's name, photograph, etc., printed on its surface. Particularly, a card is an identification (ID) card defined by International Organization for Standardization (ISO)/International Electrotechnical Commission (IEC) 7810. A card may be another type of card. The medium conveying apparatus 100 may be a fax machine, a copying machine, a multifunctional peripheral (MFP), etc.

The medium conveying apparatus 100 includes a lower housing 101, an upper housing 102, a medium tray 103, an ejection tray 104, an operation device 105, and a display device 106.

The upper housing 102 is located in a position covering a top surface of the medium conveying apparatus 100, and is engaged with the lower housing 101. The medium tray 103 is engaged with the lower housing 101 in such a way as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
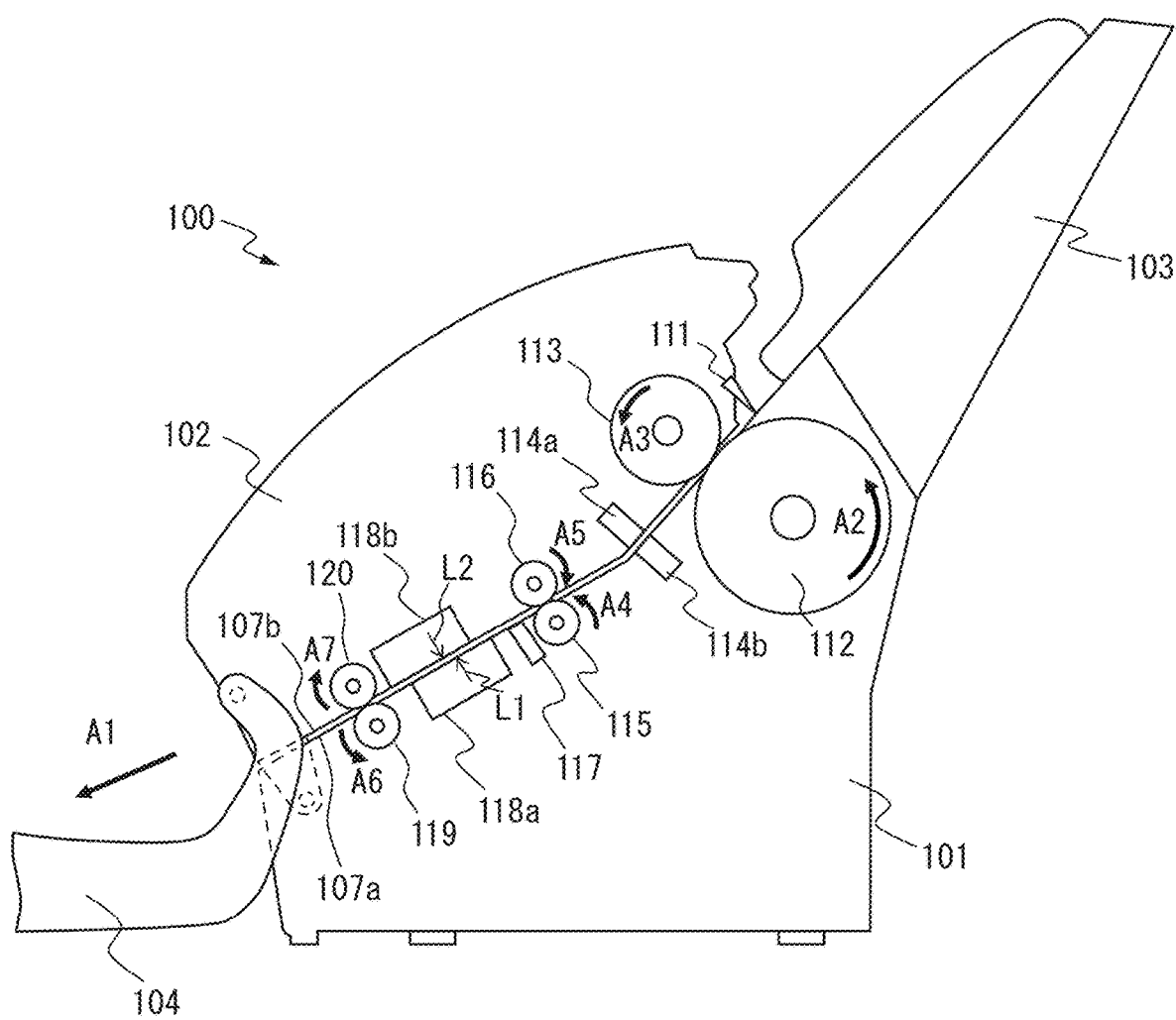
FIG. 2 is a diagram for illustrating a conveyance path inside the medium conveying apparatus 100.

FIG. 2 is a diagram for illustrating a conveyance path inside the medium conveying apparatus 100.

The conveyance path inside the medium conveying apparatus 100 includes a first medium sensor 111, a feed roller 112, a brake roller 113, an ultrasonic transmitter 114a, an ultrasonic receiver 114b, a first conveyance roller 115, a second conveyance roller 116, a first medium sensor 117, a first imaging device 118a, a second imaging device 118b, a third conveyance roller 119, and a fourth conveyance roller 120, etc. The numbers of each roller is not limited to one, and may be plural.

A top surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. An upstream hereinafter refers to an upstream in the medium conveying direction A1, and a downstream refers to a downstream in the medium conveying direction A1.

The first medium sensor 111 includes a contact detection sensor and detects whether or not a medium is placed on the medium tray 103. The first medium sensor 111 generates and outputs a medium detection signal changing the signal value between a state in which a medium is placed on the medium tray 103 and a state in which a medium is not placed.

The ultrasonic transmitter 114a and the ultrasonic receiver 114b are examples of an ultrasonic transmission module and an ultrasonic reception module, respectively. The ultrasonic transmitter 114a and the ultrasonic receiver 114b are provided on the downstream side of the feed roller 112 and the brake roller 113, and also on the upstream side of the first conveyance roller 115 and the second conveyance roller 116, i.e., on the upstream side of the first imaging device 118a and the second imaging device 118b. The ultrasonic transmitter 114a and the ultrasonic receiver 114b are located close to the conveyance path of a medium in such a way as to face one another with the conveyance path in between. The ultrasonic transmitter 114a outputs an ultrasonic wave. On the other hand, the ultrasonic receiver 114b receives an ultrasonic wave being transmitted by the ultrasonic transmitter 114a and passing through a medium, and generates and outputs an ultrasonic signal being an electric signal corresponding to the received ultrasonic wave. The ultrasonic transmitter 114a and the ultrasonic receiver 114b may be hereinafter collectively referred to as an ultrasonic sensor 114.

The second medium sensor 117 is arranged on the downstream side of the first conveyance roller 115 and the second conveyance roller 116, and on the upstream side of the first imaging device 118a and the second imaging device 118b, in the medium conveying direction A1. The second medium sensor 117 includes a light emitter and a light receiver that are provided on one side of the medium conveyance path (upper housing 102). The second medium sensor 117 includes a reflection member, such as a mirror, provided at a position facing the light emitter and the light receiver with the conveyance path in between. The light emitter projects light toward the conveyance path. On the other hand, the light receiver receives light projected by the light emitter and reflected by the reflection member, and generates and outputs a second medium signal being an electric signal based on intensity of the received light. When a medium exists at a position of the second medium sensor 117, light projected by the light emitter is shaded by the medium. A signal value of the second medium signal varies between a state in which a medium exists at the position of the second medium sensor 117 and a state in which a medium does not exist. Thereby, the second medium sensor 117 detects whether or not the medium exists at the position of the second medium sensor 117, and detects the conveyed medium. The light emitter and the light receiver of the second medium sensor 117 may be provided at positions facing one another with the conveyance path in between, and the reflection member may be omitted.

The first imaging device 118a is an example of a first imaging device. The first imaging device 118a includes a line sensor based on a unity-magnification optical system type contact image sensor (CIS) including an imaging element based on a complementary metal oxide semiconductor (CMOS) linearly located in a main scanning direction. Further, the first imaging device 118a includes a lens for forming an image on the imaging element, and an A/D converter for amplifying and analog-digital (A/D) converting an electric signal output from the imaging element. The first imaging device 118a images a front surface of a medium conveyed by the feed roller 112, the brake roller 113, the first conveyance roller 115, and the second conveyance roller 116 at the image pickup position L1 where the line sensor is located. The front surface of the medium is an example of a first surface of the medium. The first imaging device 118a sequentially generates and outputs a first line image acquired by imaging an area of a conveyed medium facing the line sensor, at certain intervals. Specifically, a pixel count of a line image in a vertical direction (subscanning direction) is 1, and a pixel count in a horizontal direction (main scanning direction) is larger than 1.

The first imaging device 118a includes a backing member located at a position facing a line sensor of the second imaging device 118b. The backing member has a particular color, such as white or black, and is imaged by the second imaging device 118b as a background of the medium. Further, the backing member is used as a reference member for correcting an image captured by the second imaging device 118b.

The second imaging device 118b is an example of a second imaging device. The second imaging device 118b includes a line sensor based on a unity-magnification optical system type CIS including an imaging element based on a CMOS linearly located in a main scanning direction. Further, the second imaging device 118b includes a lens for forming an image on the imaging element, and an A/D converter for amplifying and A/D converting an electric signal output from the imaging element. The second imaging device 118b images a back surface of a medium conveyed by the feed roller 112, the brake roller 113, the first conveyance roller 115, and the second conveyance roller 116 at the image pickup position L2 where the line sensor is located. The image pickup position L2 is arranged on the downstream side of the image pickup position L1 in the medium conveying direction A1. The image pickup position L2 may be arranged on same position as the image pickup position L1 in the medium conveying direction A1. The back surface of the medium is an example of a second surface of the medium. The second imaging device 118b sequentially generates and outputs a second line image acquired by imaging an area of a conveyed medium facing the line sensor, at certain intervals.

The second imaging device 118b includes a backing member located at a position facing the line sensor of the first imaging device 118a. The backing member has a particular color, such as white or black, and is imaged by the first imaging device 118a as a background of the medium. Further, the backing member is used as a reference member for correcting an image captured by the first imaging device 118a.

A line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs. The first imaging device 118a and the second imaging device 118b may be collectively referred to as imaging devices 118.

A medium placed on the medium tray 103 is conveyed between the lower guide 107a and the upper guide 107b in the medium conveying direction A1 by the feed roller 112 rotating in a direction of an arrow A2 in FIG. 2. When a medium is conveyed, the brake roller 113 rotate in a direction of an arrow A3. By the workings of the feed rollers 112 and the brake roller 113, when a plurality of media are placed on the medium tray 103, only a medium in contact with the feed roller 112, out of the media placed on the medium tray 103, is separated. Consequently, the medium conveying apparatus 100 operates in such a way that conveyance of a medium other than the separated medium is restricted (prevention of multi-feed).

A medium is fed between the first conveyance roller 115 and the second conveyance roller 116 while being guided by the lower guide 107a and the upper guide 107b. The medium is fed between the first imaging device 118a and the second imaging device 118b by the first conveyance roller 115 and the second conveyance roller 116 rotating in directions of an arrow A4 and an arrow A5, respectively. The medium read by the imaging devices 117 is ejected on the ejection tray 104 by the third conveyance roller 119 and the fourth conveyance roller 120 rotating in directions of an arrow A6 and an arrow A7, respectively. The feed roller 112, the brake roller 113, the first conveyance roller 115, and the second conveyance roller 116 are examples of a conveying roller for conveying a medium.

Figure 3:
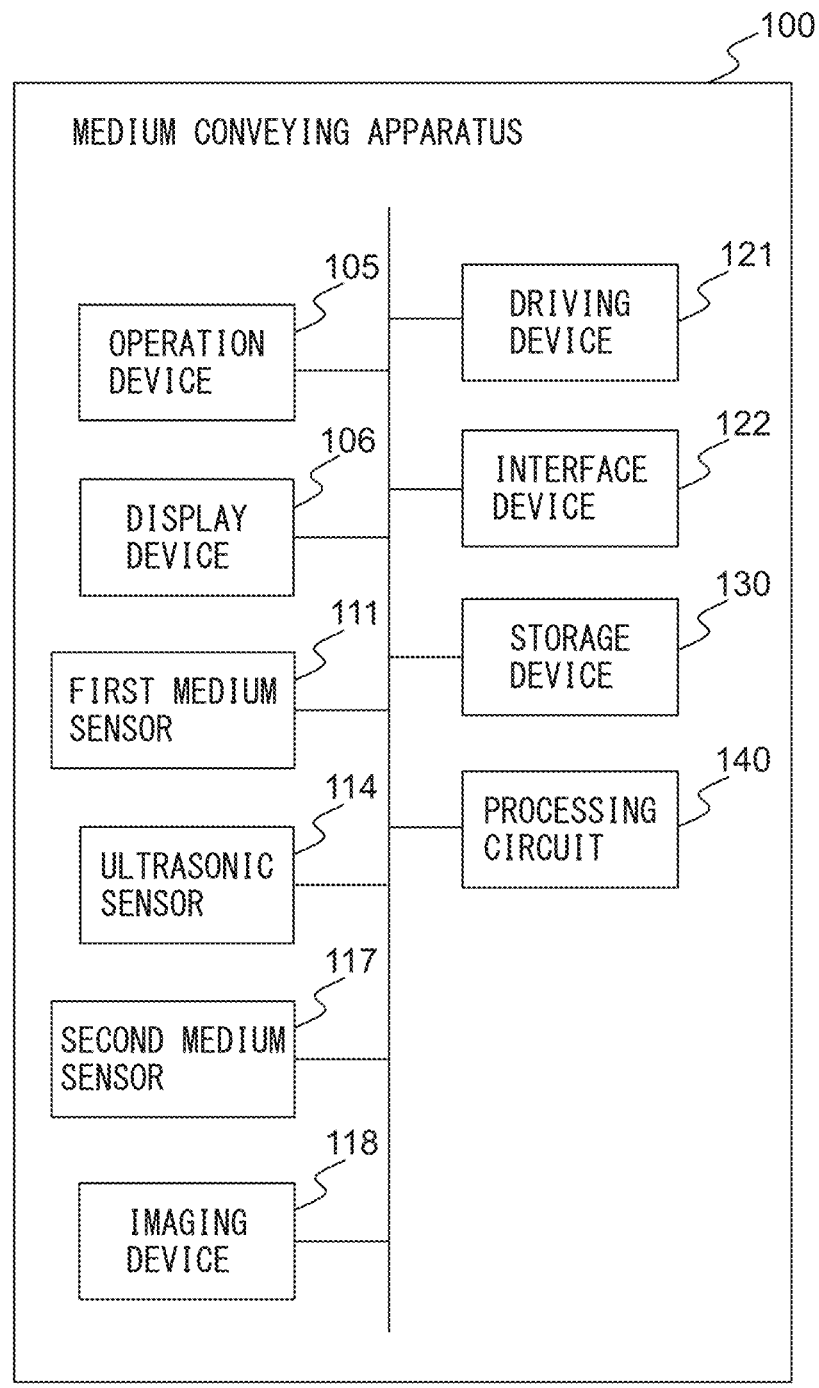
FIG. 3 is a block diagram illustrating a schematic configuration of the medium conveying apparatus 100.

FIG. 3 is a block diagram illustrating a schematic configuration of the medium conveying apparatus 100.

The medium conveying apparatus 100 further includes a driving device 121, an interface device 122, a storage device 130, and a processing circuit 140, etc., in addition to the configuration described above.

The driving device 121 includes one or a plurality of motors, and conveys a medium by rotating the feed roller 112, the brake roller 113, and the first to fourth conveyance rollers 115, 116, 119, and 120, by a control signal from the processing circuit 140.

For example, the interface device 122 includes an interface circuit conforming to a serial bus such as universal serial bus (USB), is electrically connected to an unillustrated information processing device (e.g., a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 122. For example, the predetermined communication protocol is a wireless local area network (LAN).

The storage device 130 includes a memory device such as a random access memory (RAM) or a read only memory (ROM), a fixed disk device such as a hard disk, or a portable storage device such as a flexible disk or an optical disk. Further, the storage device 130 stores a computer program, a database, a table, etc., used for various types of processing in the medium conveying apparatus 100. The computer program may be installed on the storage device 130 from a computer-readable, non-transitory medium such as a compact disc read only memory (CD-ROM), a digital versatile disc read only memory (DVD-ROM), etc., by using a well-known setup program, etc.

For example, the processing circuit 140 is a processor, such as a central processing unit (CPU). The processing circuit 140 operates in accordance with a program previously stored in the storage device 130. The processing circuit 140 may be a digital signal processor (DSP), a large scale integration (LSI), an application specific integrated circuit (ASIC), a field-programmable gate array (FPGA), etc.

The processing circuit 140 is connected to the operation device 105, the display device 106, the first medium sensor 111, the ultrasonic sensor 114, the second medium sensor 117, the imaging devices 118, the driving device 121, the interface device 122, the storage device 130, etc., and controls each of these units. The processing circuit 140 performs drive control of the driving device 121, imaging control of the imaging devices 117, etc., acquires an image, and transmits the image to an unillustrated information processing apparatus through the interface device 142. Further, the processing circuit 140 selects one surface of the conveyed medium based on each line image generated by the imaging device 118, estimates a shape of the medium based on the line image acquired by imaging the selected surface.

Figure 4:
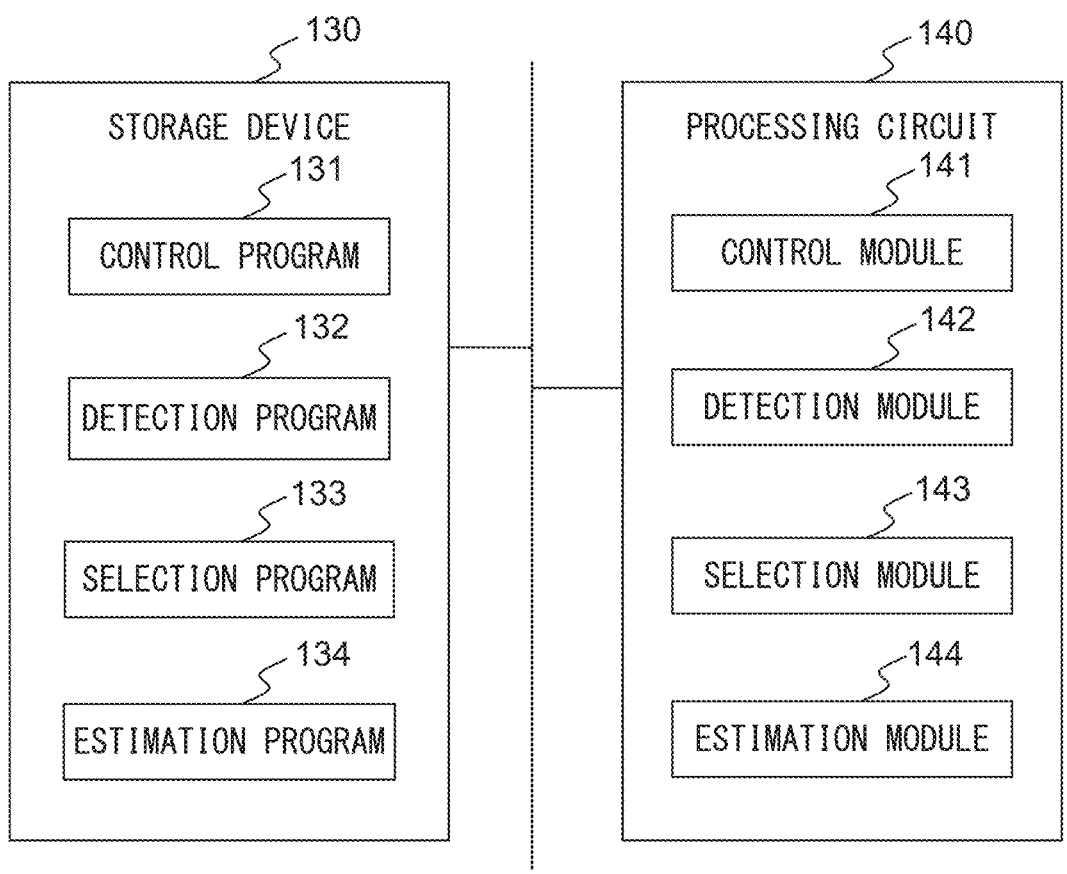
FIG. 4 is a diagram illustrating a schematic configuration of a storage device 130 and a processing circuit 140.

FIG. 4 is a diagram illustrating schematic configurations of the storage device 130 and the processing circuit 140.

As illustrated in FIG. 4, the storage device 130 stores a detection program 132, a selection program 133, and an estimation program 134, etc. Each of these programs is a functional module implemented by software operating on a processor. The processing circuit 140 reads each program stored in the storage device 130 and operates in accordance with each read program. Consequently, the processing circuit 140 functions as a control module 141, a detection module 142, a selection module 143, and an estimation module 144.

Figure 5:
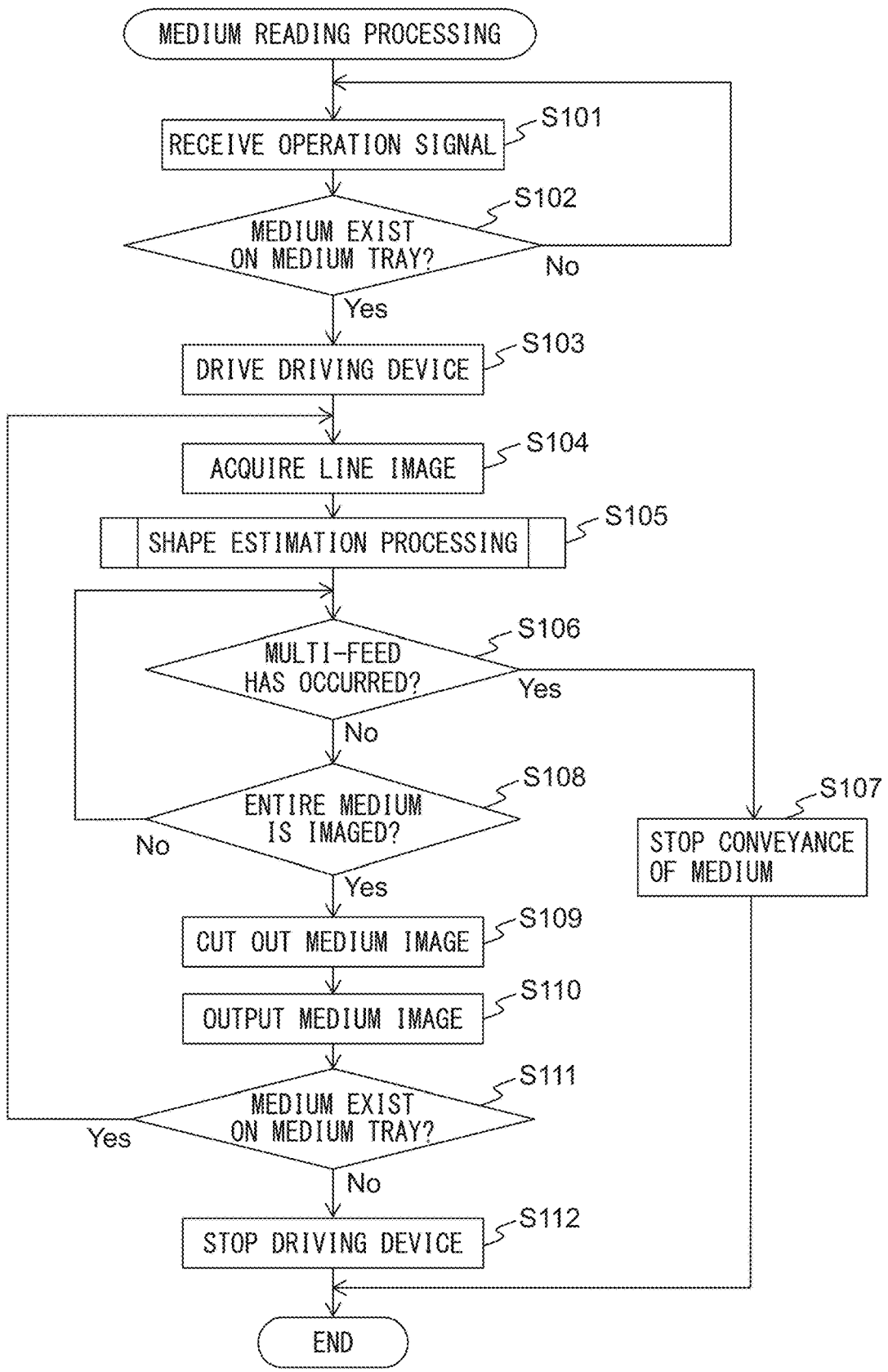
FIG. 5 is a flowchart illustrating an operation example of medium reading processing.

FIG. 5 is a flowchart illustrating an operation example of medium reading processing in the medium conveying apparatus 100.

Referring to the flowchart illustrated in FIG. 5, an operation example of the medium reading processing in the medium conveying apparatus 100 will be described below. The operation flow described below is executed mainly by the processing circuit 140 in cooperation with each element in the medium conveying apparatus 100, in accordance with a program previously stored in the storage device 130. The operation flow illustrated in FIG. 5 is periodically executed.

First, the control module 141 stands by until an instruction to read a medium is input by a user by use of the operation device 105, and an operation signal instructing to read the medium is received from the operation device 105 (step S101).

Next, the control module 141 determines whether or not a medium is placed on the medium tray 103, based on a first medium signal received from the first medium sensor 111 (step S102).

When a medium is not placed on the medium tray 103, the control module 141 returns the processing to step S101 and stands by until newly receiving an operation signal from the operation device 105.

On the other hand, when a medium is placed on the medium tray 103, the control module 161 drives the driving device 121, rotates the feed rollers 112, the brake rollers 113, and the first to fourth conveyance rollers 115, 116, 119, and 120, and feeds and conveys the medium (step S103).

Next, the control module 141 causes the imaging device 118 to image the conveyed medium to acquire the first line image and the second line image (step S104).

Next, the processing circuit 140 executes the shape estimation processing (step S105). In the shape estimation processing, the processing circuit 140 selects either surface of the conveyed medium from the first line image and the second line image, and estimates a shape of the medium based on the line image acquired by imaging the selected surface. The shape of the medium includes a first shape or a second shape. The first shape is whether or not the shape is a shape of a card. The second shape is an outer shape of the medium. Details of the shape estimation processing will be described later.

Next, the control module 141 determines whether or not it has been determined in a multi-feed determination process (described later) that multi-feed of the medium has occurred (step S106).

When it is determined that multi-feed has occurred, the control module 141, as an abnormality process, stops the driving device 121, stops the conveyance of the medium, and notifies the user that an abnormality has occurred, by using a speaker (not shown), LEDs, etc., (step S107). Then, the control module 141 ends series of steps. The control module 141 may stop conveying the next medium after eject of the currently conveyed medium, instead of immediately stopping conveying the medium, as the abnormal processing.

On the other hand, when it is not determined that multi-feed has occurred, the control module 141 determines whether or not the entire conveyed medium has been imaged (step S108).

For example, the control module 141 acquires a second medium signal from the second medium sensor 117 and determines whether or not a medium exists at the position of the second medium sensor 117 based on the acquired second medium signal. When a signal value of the second medium signal changes from a value indicating nonexistence of a medium to a value indicating existence of a medium, the control module 141 determines that the front edge of the medium passes the position of the second medium sensor 117. Then, when a signal value of the second medium signal changes from the value indicating existence of a medium to the value indicating nonexistence of a medium, the control module 141 determines that the rear edge of the medium passes the position of the second medium sensor 117. The control module 141 determines that the entire conveyed medium has been imaged when a predetermined period elapses after determining that the rear edge of the medium passes the position of the second medium sensor 117. The control module 141 may determine that the entire conveyed medium has been imaged, when the control module 141 acquires a predetermined number of line images from the imaging device 118.

When the entire conveyed medium has not been imaged, the control module 141 returns the processing to step S106 and repeats the processing in step S106 to S108.

On the other hand, when the entire conveyed medium is imaged, the control module 141 cuts out a medium image from the first line image and the second line image based on the shape estimated in the shape estimation processing, in particular, the second shape that is the outer shape of the medium (step S109). The control module 141 cuts out a first medium image from a first read image in which all the first line images are combined, and cuts out a second medium image from a second read image in which all the second line images are combined. The control module 141 cuts out an area corresponding to the outer shape of the medium estimated in the shape estimation processing from the line images acquired by imaging the surface of the medium selected in the shape estimation processing to generate the medium image. On the other hand, the control module 141 cuts out an area in which the area corresponding to the outer shape of the medium estimated in the shape estimation processing is reversed (reversed left and right) in the main scanning direction from the line image acquired by imaging the surface of the medium that is not selected in the shape estimation processing to generate the medium image.

Next, the control module 141 outputs the first medium image and the second medium image by transmitting them to an information processing apparatus (not shown) via the interfacing apparatus 122 (step S110).

Next, the control module 141 determines whether or not a medium remains on the medium tray 103 based on a first medium signal acquired from the first medium sensor 111 (step S111). When a medium remains on the medium tray 103, the control module 171 returns the processing to step S104 and repeats the processing in steps S104 to S107.

On the other hand, when a medium does not remain on the medium tray 103, the control module 141 stops the driving device 121 (step S112) and ends series of steps.

Figure 6:
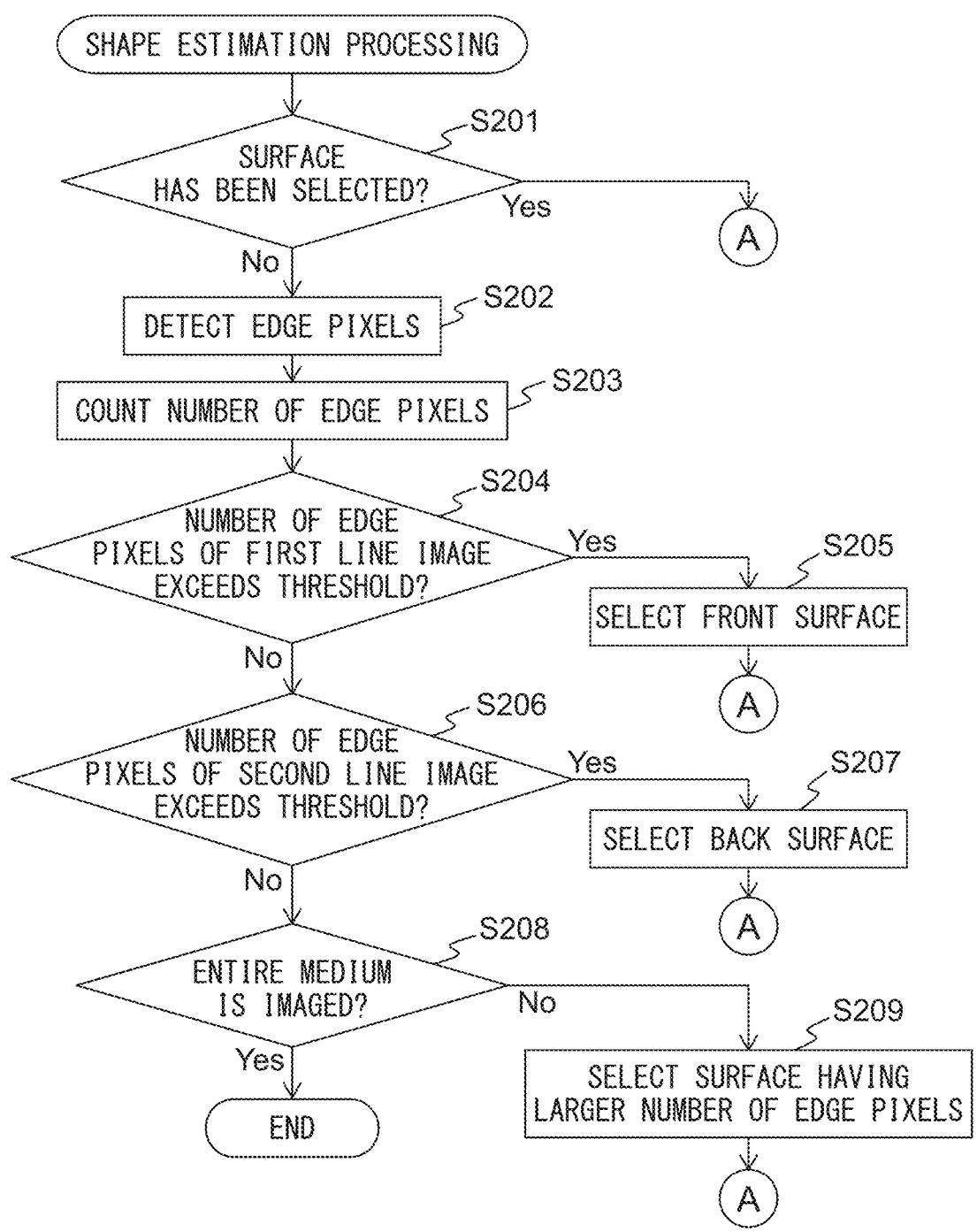
FIG. 6 is a flowchart illustrating an operation example of shape estimation processing.
Figure 7:
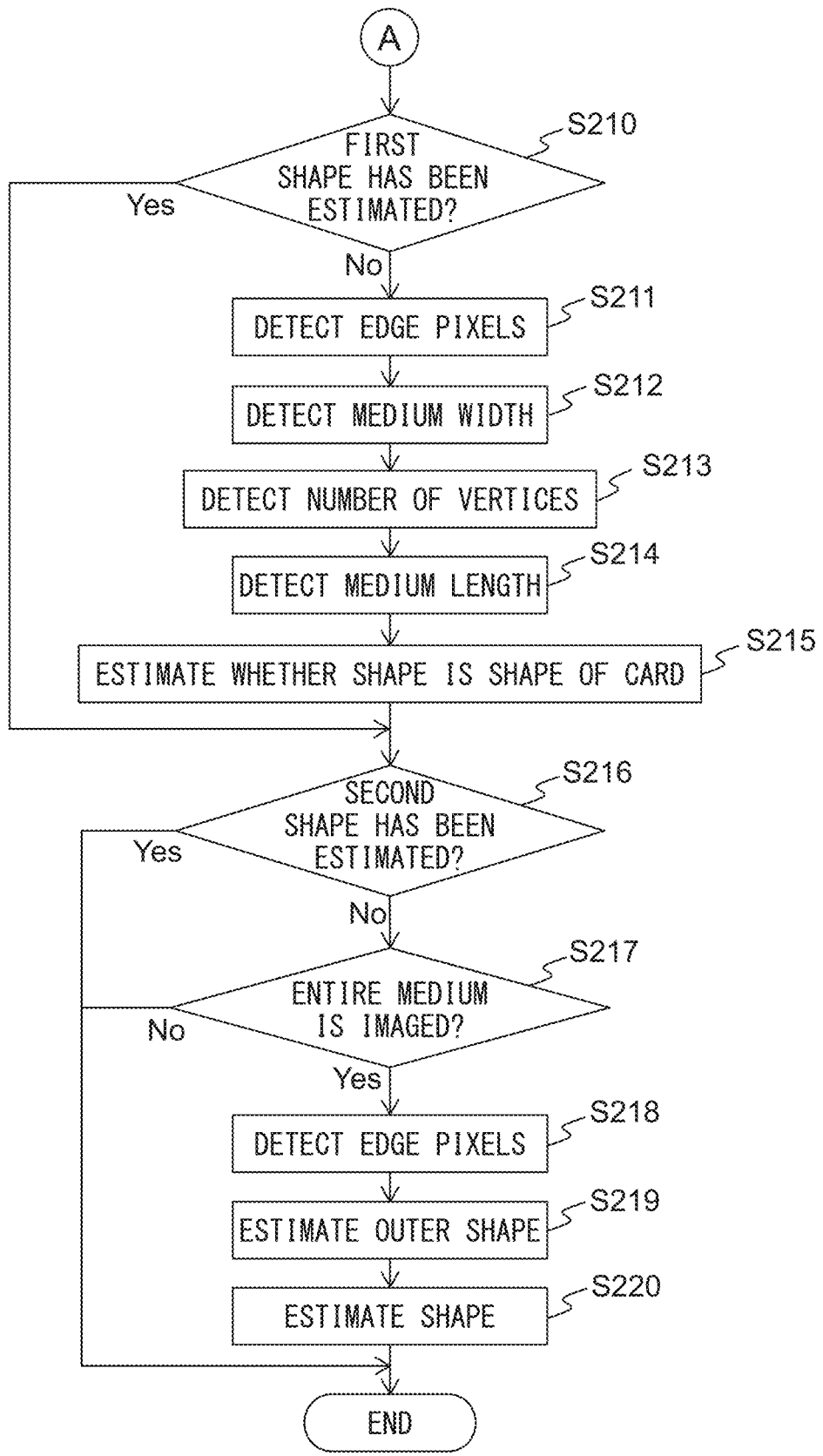
FIG. 7 is a flowchart illustrating an operation example of shape estimation processing.

FIG. 6 is a flowchart illustrating an operation example of the shape estimation processing.

The flow of operations shown in FIG. 6 is performed in step S105 of the flow chart shown in FIG. 5.

First, the detection module 142 determines whether or not a surface of the medium for estimating a form of the medium has been selected (step S201). When the surface of the medium has been selected, the detection module 142 proceeds the process to step S210.

On the other hand, when the surface of the medium has not been selected, the detection module 142 detects edge pixels from the first line image and the second line image (step S202). That is, the detection module 142 detects the edge pixels for each of the first line image and the second line image sequentially generated. The detection module 142 calculates an absolute value (hereinafter, referred to as an adjacent difference value) of a difference in gradation values between each pixel and pixel adjacent to the right side of each pixel or pixel apart to the right side from each pixel by a predetermined distance, in order from the left end of each line image. The gradation value is a luminance value or a color value. The detection module 142 detects the first (leftmost) pixel whose adjacent difference value is equal to or larger than the edge threshold as the left edge pixel. The edge threshold can be set, for example, to a difference (e.g., 20) of gradation values that a person can visually distinguish a difference in brightness on an image. Similarly, the detection module 142 calculates an adjacent difference value between each pixel and the left pixel of each pixel in order from the right end of each line image, and detects the first pixel whose adjacent difference value is equal to or larger than the edge threshold as the right edge pixel. The detection module 142 may calculate the adjacent difference value between each pixel and the left pixel of each pixel in order from the left end of each line image, and detect the last pixel whose adjacent difference value is equal to or larger than the edge threshold value as the right edge pixel. When there is no pixel whose adjacent difference value is equal to or larger than the edge threshold value, the detection module 142 detect no edge pixel from the line image.

Further, the detection module 142 may calculate the absolute value of the difference between the gradation values of the two pixels adjacent to each pixel or apart from each pixel by a predetermined distance in the horizontal or vertical direction as the adjacent difference value. Further, when the gradation value of a specific pixel is less than a threshold value and the gradation value of a pixel adjacent to the specific pixel or a pixel apart from the specific pixel by a predetermined distance is equal to or larger than the threshold value, the detection module 142 may extract the specific pixel, the pixel adjacent to the specific pixel, or the pixel apart from the specific pixel by the predetermined distance as an edge pixel.

Figure 8A:
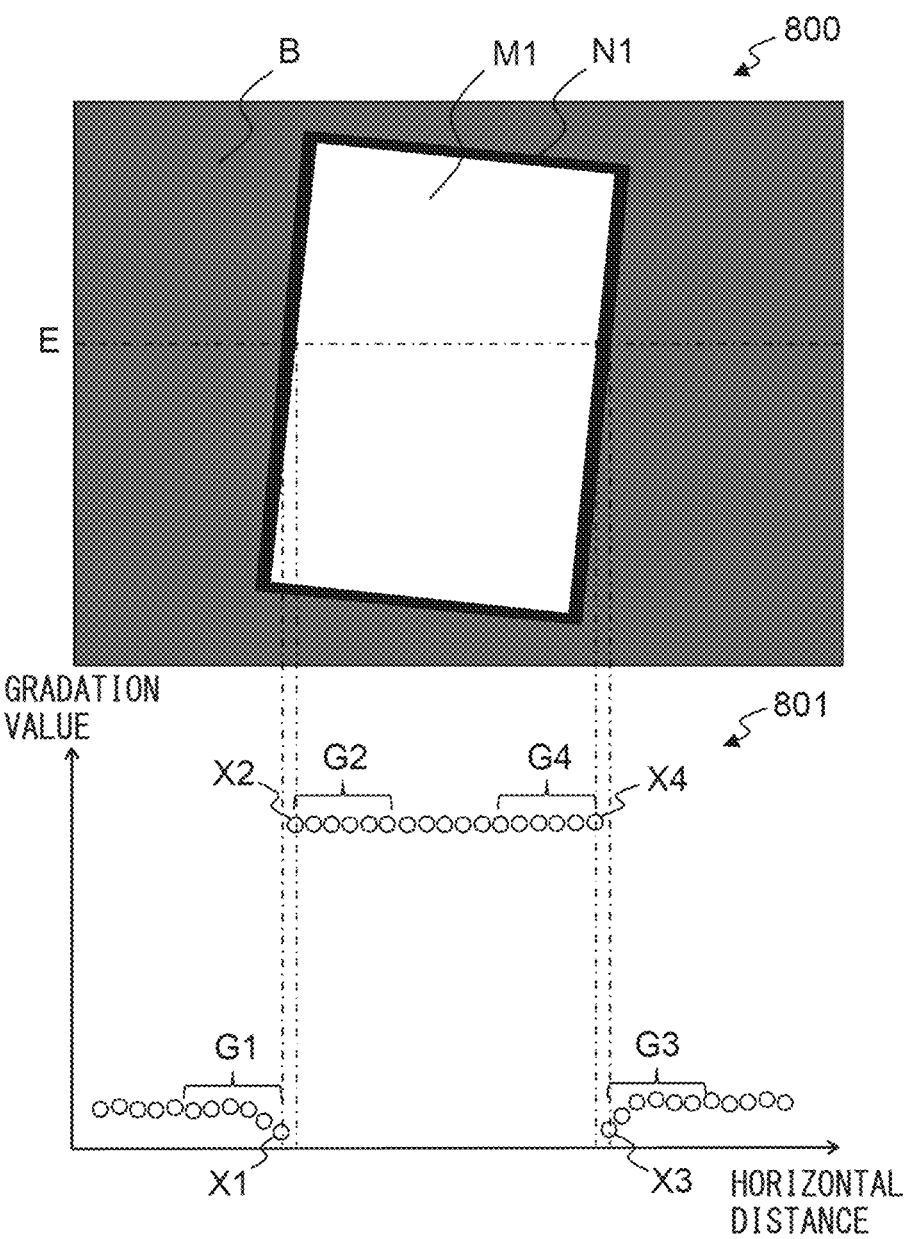
FIG. 8A is a schematic diagram for illustrating an edge pixel.
Figure 8B:
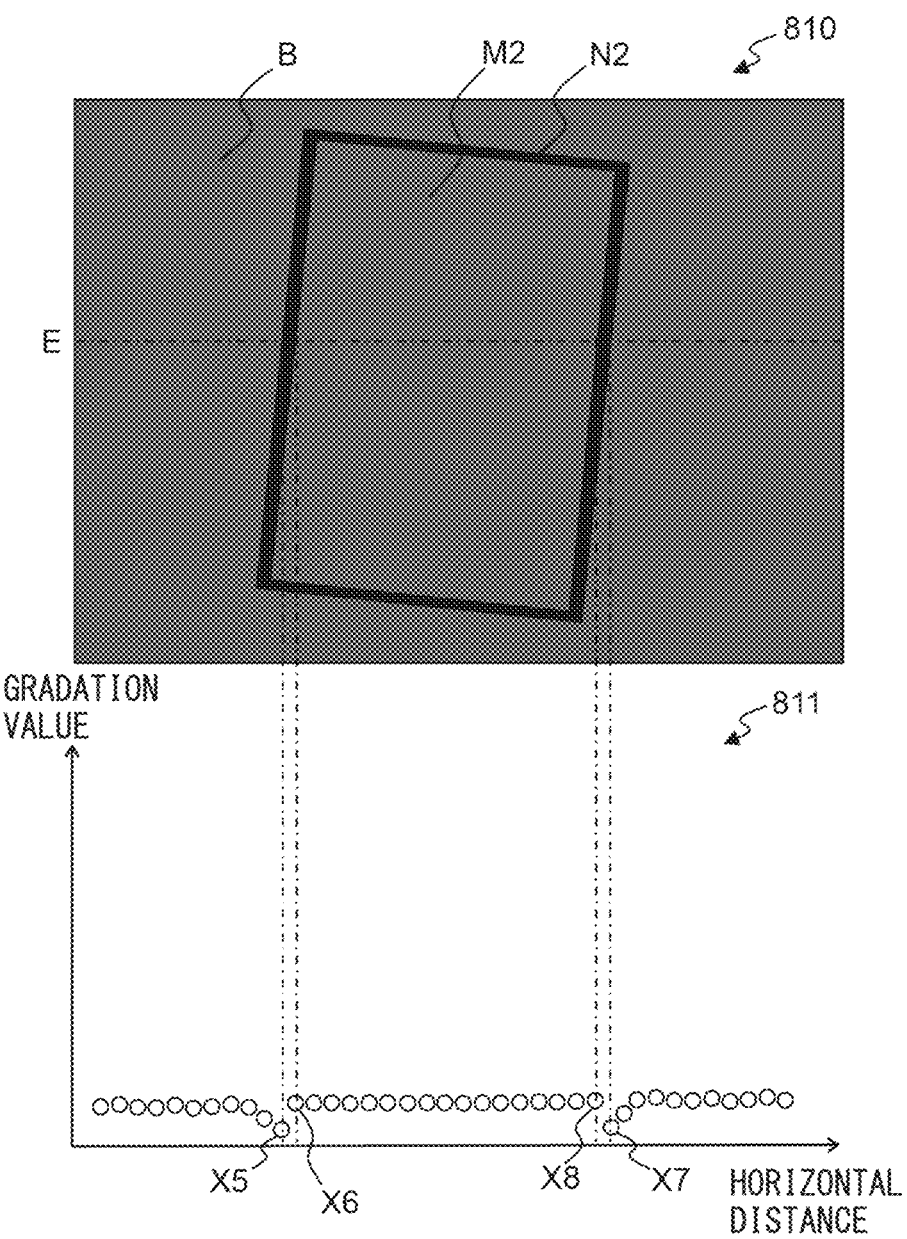
FIG. 8B is a schematic diagram for illustrating an edge pixel.

FIG. 8A and FIG. 8B are schematic diagrams for illustrating the edged pixels.

Image 800 of FIG. 8A is an image in which a medium M1 having a different color from a backing member B is imaged. In the example shown in image 800, the backing member B has a black color and the medium M1 has a white color. As shown in the image 800, when the backing member B and the medium M1 have colors different from each other, the boundary between the backing member B which is the background and the medium M1, is clearly identified. In the image 800, a shadow N1 is formed by the medium M1 at the boundary between the medium M1 and the backing member B.

Graph 801 of FIG. 8A is a graph showing the gradation value of each pixel in a predetermined line E in the image 800. The horizontal axis of graph 801 indicates the position in the horizontal direction in the image, and the vertical axis of graph 801 indicates the gradation value of the pixels at each position. As shown in the graph 801, the gradation values of each pixel corresponding to the backing member B and the shadow N1 are sufficiently low, and the gradation values of each pixel corresponding to the medium M1 are sufficiently high. Therefore, a pixel X1 is detected as the left edge pixel, wherein the pixel X1 corresponds to the backing member B or the shadow N1, and a pixel X2 adjacent to the pixel X1 corresponds to the medium M1. Further, a pixel X3 is detected as the right edge pixel, wherein the pixel X3 corresponds to the backing member B or the shadow N1, and a pixel X4 adjacent to the pixel X3 on the left side corresponds to the medium M1.

On the other hand, the image 810 of FIG. 8B is an image in which a medium M2 having the similar color to a backing member B is imaged. In the example shown in image 810, the backing member B and the medium M2 have a black color. In the image 810, similarly to the image 800, a shadow N2 is formed by the medium M2 at the boundary between the medium M2 and the backing member B. As shown in image 810, when the backing member B and the medium M2 have colors similar to each other, the boundary between the backing member B and the medium M2 is difficult to be identified. In particular, when the backing member B and the medium M2 have a black color, the shadow N2 is also difficult to be identified.

Graph 811 of FIG. 8B is a graph showing the gradation value of each pixel in a predetermined line E in the image 810. The horizontal axis of graph 811 indicates the position in the horizontal direction in the image, and the vertical axis of graph 811 indicates the gradation value of the pixel at each position. As shown in the graph 811, each pixel corresponding to the backing member B and the shadow N2 and each pixel corresponding to the medium M2 have a gradation value that is mutually approximated. Therefore, a pixel X5 and a pixel X7 may not be detected as edge pixel, wherein the pixel X5 corresponds to the backing member B or the shadow N2 and a pixel X6 adjacent to the pixel X5 on the right side corresponds to the medium M2, and wherein the pixel X7 corresponds to the backing member B or the shadow N2 and a pixel X8 adjacent to the pixel X7 on the left side corresponds to the medium M2.

Generally, as shown in FIGS. 8A and 8B, there are many ID cards having a dark color such as black on the first surface (front surface) and a bright color such as white on the second surface (back surface). Therefore, the accuracy of correctly estimating the shape of the medium differs greatly depending on which surface is used.

Next, the selection module 143 counts the number (sum) of the edge pixels detected from the first line image and the second line image by the detection module 142 so far (step S203).

Next, the selection module 143 determines whether or not the number of edge pixels detected from the first line image exceeds the pixel number threshold (step S204). The pixel number threshold is an example of a predetermined threshold. The pixel number threshold is set to a value sufficiently larger than a number of edge pixels that are erroneously detected due to noise, etc. When the number of edge pixels detected from the first line image exceeds the pixel number threshold, the selection module 143 selects a surface (front surface) corresponding to the first line image as a surface of the medium for estimating the shape of the medium (step S205), and proceeds the process to step S210. Hereinafter, a line image selected as a surface of the medium for estimating the shape of the medium may be referred to as a selected line image.

On the other hand, when the number of edge pixels detected from the first line image is equal to or less than the pixel number threshold, the selection module 143 determines whether or not the number of edge pixels detected from the second line image exceeds the pixel number threshold (step S206). When the number of edge pixels detected from the second line image exceeds the pixel number threshold, the selection module 143 selects the surface (back surface) corresponding to the second line image as a surface of the medium for estimating the shape of the medium (step S207), and proceeds the process to step S210.

On the other hand, when the number of edge pixels detected from the second line image is equal to or less than the pixel number threshold, the selection module 143 determines whether or not the entire conveyed medium has been imaged, in the same manner as the process of the step S108 (step S208). When the entire medium has been imaged, the selection module 143 compares the number of edge pixels detected from the first line image so far and the number of edge pixels detected from the second line image so far. The selection module 143 selects a surface corresponding to the line image having the larger number of edge pixels as a surface of the medium for estimating the shape of the medium (step S209), and proceeds the process to step S210. When the entire medium has been imaged, the selection module 143 may select a preset surface of the medium. On the other hand, when the entire medium has not been imaged, the selection module 143 ends series of steps without selecting a surface of the medium.

Thus, each time the first line image and the second line image are generated, the selection module 143 counts the number of the detected edge pixels, and selects the first surface or the second surface that corresponds to a line image a counted number of which first exceeds the pixel number threshold, as a surface of the medium for estimating the shape of the medium. That is, the selection module 143 selects either surface of the first surface or the second surface of the medium, based on the number of the edge pixels detected from the first line image and the second line image that are sequentially generated.

Thus, the selection module 143 can select a surface having more effective data for specifying the end portion of the medium. Further, the selection module 143 can select a surface of the medium without performing complicated image processing, and can suppress an increase in the processing load of the shape estimation processing. Further, since the selection module 143 selects a surface of the medium in real time with respect to the sequentially generated line image, the selection module 143 can select a surface of the medium before the entire medium is imaged, reduce the processing load of the shape estimation process and reduce the use of resources such as memory. Further, since the selection module 143 early selects a surface of the medium, the estimation module 144 can early estimate the shape of the medium, in particular the first shape.

The selection module 143 may execute the determination of the second line image captured by the second imaging device 118b having the imaging position L2 on the downstream side of the imaging position L1 of the first imaging device 118a preferentially (earlier) than the determination of the first line image captured by the first imaging device 118a. Thus, when the number of edge pixels detected from the first line image and the second line image is the same, the selection module 143 can select a line image including a smaller amount of medium, and can select a line image having higher reliability.

Further, the selection module 143 may compare a number of edge pixels detected from a predetermined number of the first line image and a number of edge pixels detected from a predetermined number of the second line image, and select a surface of the medium corresponding to the line image whose number of edge pixels is larger. Again, the medium conveying apparatus 100 can estimate the shape of the medium with larger precision using the surface of the medium having more effective data for specifying the end portion of the medium.

Next, the estimation module 144 determines whether or not the shape of the first shape, that is, whether or not the shape is the shape of the card, has been estimated as the shape of the medium (step S210). When the first shape has been estimated, the estimation module 144 proceeds the process to step S216.

On the other hand, when the first shape has not been estimated, the estimation module 144 detects edge pixels from the selected line image (step S211). The estimation module 144 detects the edge pixels, in the same manner as in the process of the step S202. The estimation module 144 may use detected edge pixels for the selected line image where the edge pixels has already been detected in the step S202, and detect edge pixels only for the selected line image where edge pixels has not been detected.

Next, the estimation module 144 detects medium width in each selected line images based on the detected edge pixels, and stores the medium width in the storage device 130 (step S212). The estimation module 144 detects the distance (number of pixels) between the left edge pixel and the right edge pixel as the medium width.

Next, the estimation module 144 detects a number of vertices of the medium included in the sequentially generated selected line images based on the medium width in each selected line images (step S213).

When the medium width equal to or larger than a predetermined width (e.g., one pixel) is not detected in any of the selected line images acquired so far, the estimation module 144 determines that the number of vertices of the medium is 0. When the medium width equal to or larger than the predetermined width is detected, the estimation module 144 detects a change in the medium width in each selected line image. The estimation module 144 identifies the newly acquired selected line image as a target image, and identifies the selected line image acquired immediately before acquiring the target image as a reference image. When the medium width in the target image is larger than the medium width in the reference image, the estimation module 144 determines that the number of vertices of the medium is 1. On the other hand, when the medium width in the target image is substantially the same as the medium width in the reference image, the estimation module 144 determines that the number of vertices of the medium is 2. On the other hand, when the medium width in the target image is less than the medium width in the reference image and the medium width in the target image is larger than 0, the estimation module 144 determines that the number of vertices of the medium is 3. On the other hand, when the medium width in the target image is 0, the estimation module 144 determines that the number of vertices of the medium is 4.

FIGS. 9A to 9F and FIG. 10 are schematic diagrams for illustrating the relation between the change of the medium widths and the number of vertices.

Figure 9A:
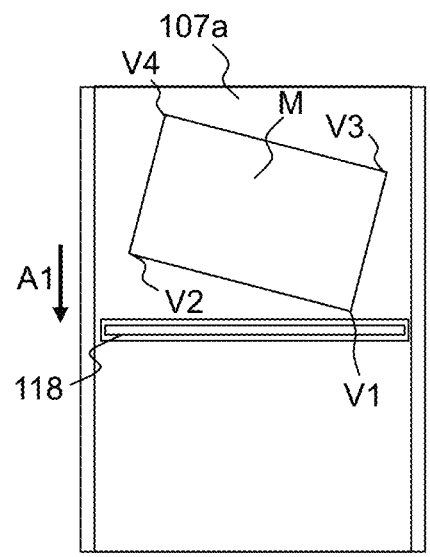
FIG. 9A is a schematic diagram for illustrating relation between change of a medium width and a number of vertices.
Figure 9B:
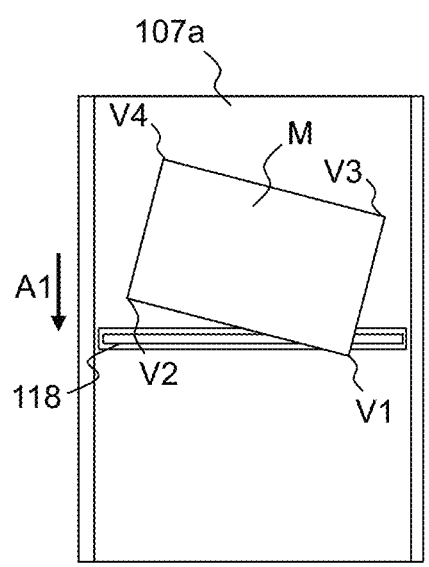
FIG. 9B is a schematic diagram for illustrating relation between change of a medium width and a number of vertices.
Figure 9C:
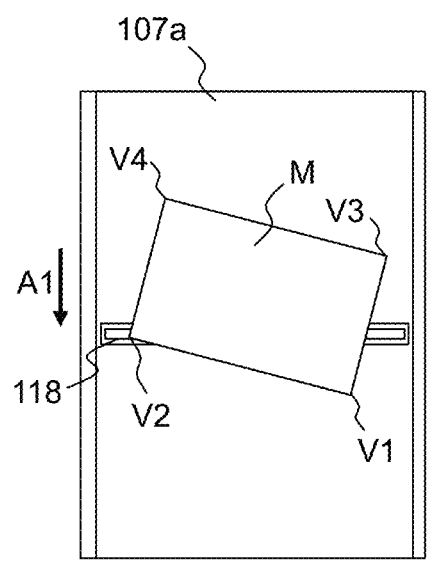
FIG. 9C is a schematic diagram for illustrating relation between change of a medium width and a number of vertices.
Figure 9D:
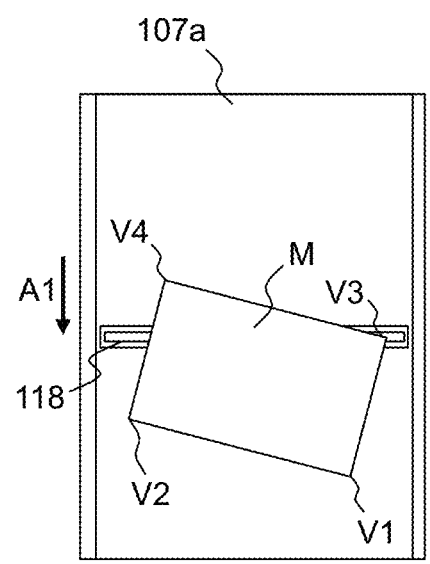
FIG. 9D is a schematic diagram for illustrating relation between change of a medium width and a number of vertices.
Figure 9E:
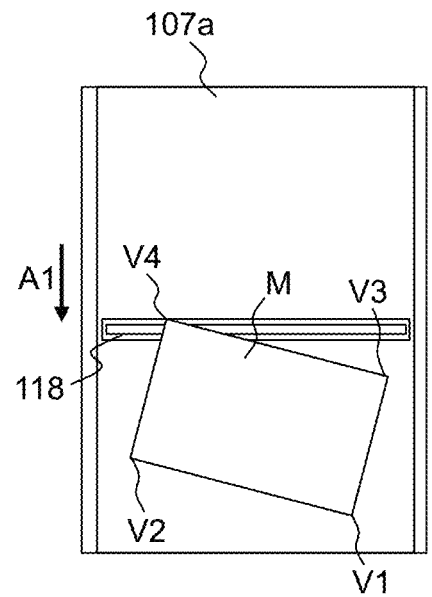
FIG. 9E is a schematic diagram for illustrating relation between change of a medium width and a number of vertices.
Figure 9F:
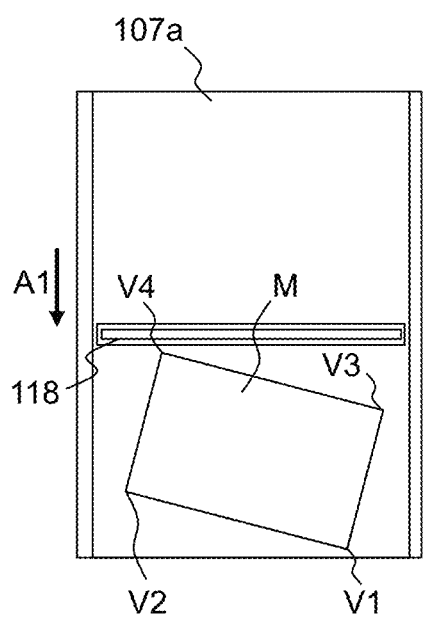
FIG. 9F is a schematic diagram for illustrating relation between change of a medium width and a number of vertices.
Figure 10:
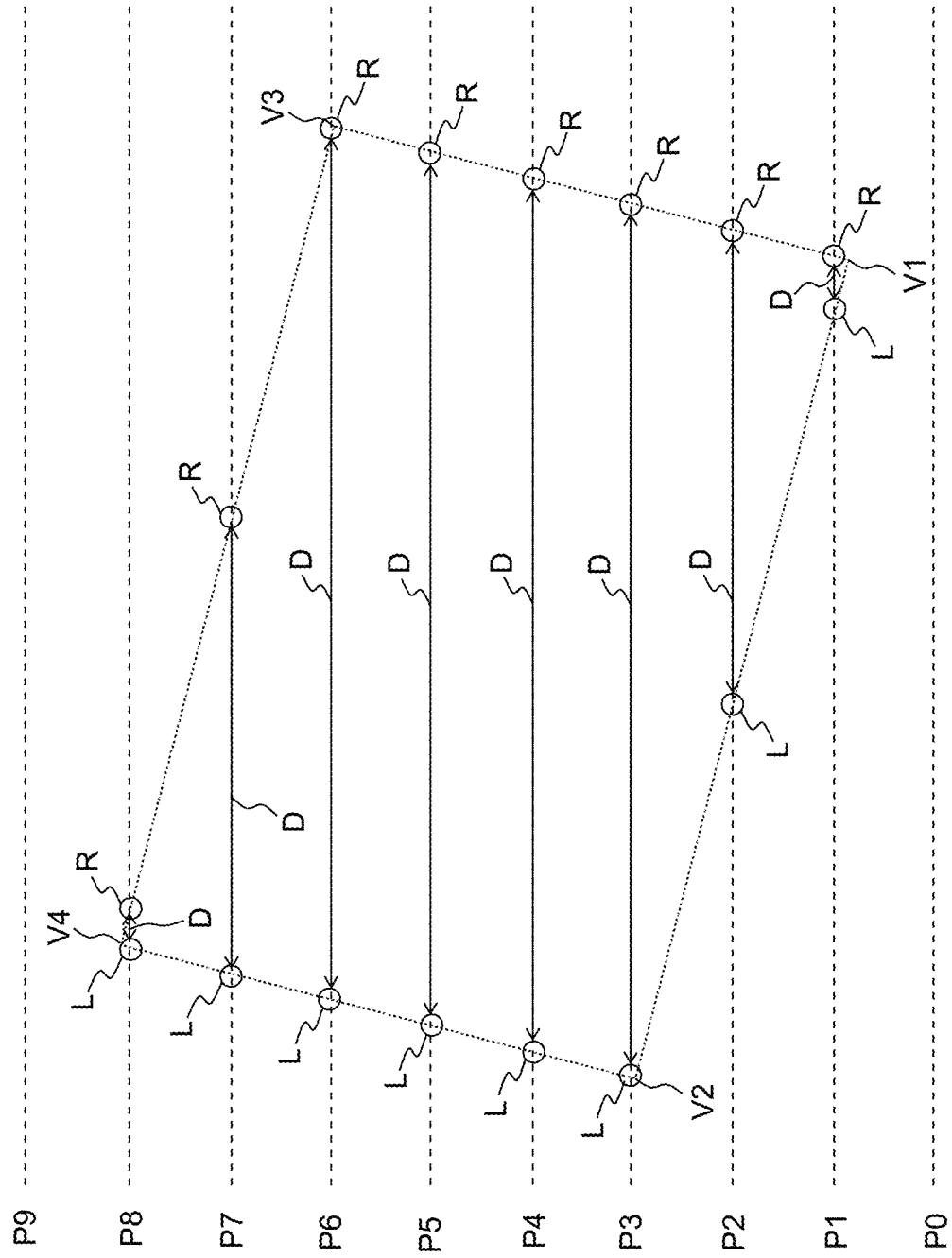
FIG. 10 is a schematic diagram for illustrating relation between change of a medium width and a number of vertices.

FIGS. 9A to 9F show a medium M having a rectangular shape and being conveyed in an inclined manner. As shown in FIGS. 9A to 9F, the media M may be conveyed in an inclined manner. When the media M is conveyed in an inclined manner, each vertex V1-V4 of the media M passes through the imaging position of the imaging device 118 at a different timing, respectively. FIG. 10 shows a plurality of line images P0-P9 in which the medium M was imaged during conveying. For ease of explanation, only a plurality of line images P0 to P9 are displayed in FIG. 10, but a large number of line images are imaged while each line image is imaged.

The drawing 9A shows the medium M in which neither of the vertices has reached the imaging position, and the line image P0 of FIG. 10 is imaged at this time. FIG. 9B shows the medium M immediately after the first vertex V1 passes through the imaging position, and the line image P1 of FIG. 10 is imaged at this time. FIG. 9C shows the medium M in which the second vertex V2 with reaching the imaging position, and the line image P3 of FIG. 10 is imaged at this time. FIG. 9D shows the medium M with the third vertex V3 reaching the imaging position, and the line image P6 of FIG. 10 is imaged at this time. FIG. 9E shows the medium M immediately before the fourth vertex V4 reaches the imaging position, and the line image P8 of FIG. 10 is imaged at this time. FIG. 9F shows the medium M with all the vertices passing through the imaging position, and the line image P9 in FIG. 10 is imaged at this time.

As shown in FIG. 10, the line image from the line image imaged immediately before the line image P1 to the line image imaged immediately before the line image P3 includes only one vertex V1. In these line images, the newly imaged line image, the distance D between the edge pixels L and R at both ends increases. That is, when the medium width in the target image is larger than the medium width in the reference image, the estimation module 144 can determine that the number of vertices of the medium included in the line image acquired so far is 1.

As shown in FIG. 10, the line image from the line image imaged immediately before the line image P1 to the line image imaged immediately before the line image P6 includes two vertices V1 and V2. In each line image from the line image imaged immediately after the line image P3 to the line image imaged immediately before the line image P6, the distance D between the edge pixels L and R at both ends is the same. That is, when the medium width in the target image is the same as the medium width in the reference image, the estimation module 144 can determine that the number of vertices of the medium included in the line image acquired so far is 2.

As shown in FIG. 10, the line image from the line image imaged immediately before the line image P1 to the line image P8 includes three vertices V1, V2, and V3. Then, in each line image from the line image imaged immediately after the line image P6 to the line image P8, the newly imaged line image, the distance D between the edge pixels L and R at both ends decreases, and the medium is present. That is, when the medium width in the target image is less than the medium width in the reference image and the medium is present in the target image, the estimation module 144 can determine that the number of vertices of the medium included in the line image acquired so far is three.

As shown in FIG. 10, the line image from the line image imaged immediately before the line image P1 to the line image imaged after the line image P8 includes four vertices V1, V2, V3, and V4. The line image imaged after the line image P8 does not include the medium M. That is, when there is no medium in the target image, the estimation module 144 can determine that the number of vertices of the medium included in the line image acquired so far is 4.

Next, the estimation module 144 detects a medium length in the vertical direction (sub-scanning direction) of the medium included in the sequentially generated selected line image, that is, in a direction perpendicular to the medium width (step S214). As described above, the number of pixels in the vertical direction (sub-scanning direction) of the line image is 1. The estimation module 144 detects a number of images from the selected line image in which the medium width equal to or larger than the predetermined width is first detected to the latest selected line image or the selected line image in which the medium width becomes to 0 first, as the medium length (the number of pixels in the vertical direction) of the medium included in the selected line image.

Next, the estimation module 144 estimates the first shape of the medium, that is, whether or not the shape of the medium is the shape of the card, based on the detected number of vertices and the medium length (step S215).

When any of the detected media widths exceeds a predetermined length, the estimation module 144 estimates that the shape of the media is not the shape of the card. The predetermined length is set based on, for example, the size of the ID card defined by ISO/IEC7810. The ID card defined by ISO/IEC7810 has a substantially rectangular shape with a long side of 85.60 mm and a short side of 53.98 mm. The angles of the four vertices of the ID card may be rounded instead of right angles. The predetermined length is set to, for example, the number of pixels corresponding to a value (e.g., 102 mm) acquired by adding a margin to the length (101.20 mm) of the diagonal of the ID card. No matter how inclined the ID card is conveyed, the imaged width of the ID card does not exceed the length of the defined length of the diagonal. Therefore, when the medium width exceeds a predetermined length, the estimation module 144 can determine that the shape of the medium is not the shape of the card.

When the medium length is equal to or larger than the first threshold value and the number of vertices is less than 2, the estimation module 144 estimates that the shape of the medium is not the shape of the card.

Figure 11A:
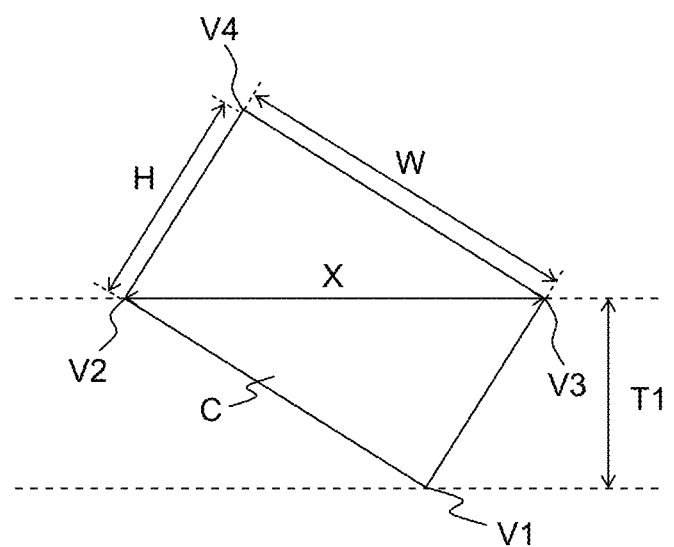
FIG. 11A is a schematic diagram for illustrating a first threshold value.

FIG. 11A is a schematic diagram for illustrating the first threshold.

As shown in FIG. 11A, the first threshold value is set to, for example, a number of pixels corresponding to a value (e.g., 46 mm) acquired by adding a margin to the distance T1 (45.66 mm) between the diagonal X of the ID card C defined by ISO/IEC7810 and the vertex not included in the diagonal X. The distance T1 is calculated by solving the following relational expressions (1) and (2) assuming that the long side of the ID card C is W (85.60 mm) and the short side is H (53.98 mm).

$$H^2 + W^2 = X^2 \quad (1)$$

$$H \times W = X \times T1 \quad (2)$$

During conveying the ID card C, at least one of the vertex V2 and the vertex V3 sharing the side with the vertex V1 always passes through the imaging position when the ID card C is further conveyed by the distance T1 after the vertex V1 passes through the imaging position, no matter how the ID card C is tilted. Therefore, when the medium length is equal to or larger than the first threshold value and the number of vertices is less than 2, the estimation module 144 can determine that the medium is a medium larger than the card.

When the medium length is equal to or larger than the second threshold value and the number of vertices is less than 3, the estimation module 144 estimates that the shape of the medium is not the shape of the card.

Figure 11B:
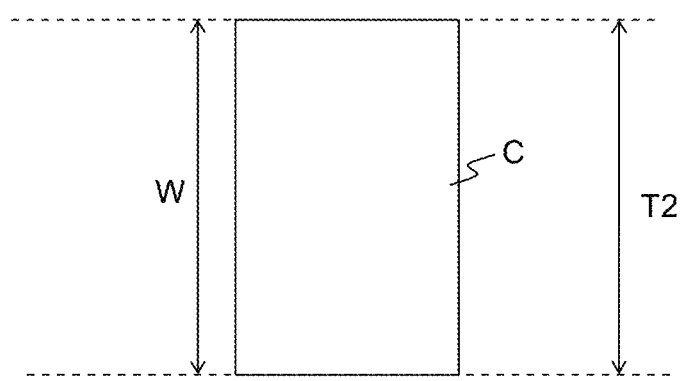
FIG. 11B is a schematic diagram for illustrating a second threshold value.

FIG. 11B is a schematic diagram for explaining the second threshold.

As shown in FIG. 11B, the second threshold value is set to, for example, a number of pixels corresponding to a value (e.g., 86 mm) acquired by adding a margin to the length T2 (85.60 mm) of the long side W of the ID card C defined by ISO/IEC7810.

During conveying the ID card C, both the vertex V2 and the vertex V3 sharing the side with the vertex V1 always pass through the imaging position when the ID card C is further conveyed by the distance T2 after the vertex V1 passes through the imaging position, no matter how the ID card C is conveyed. Therefore, when the medium length is equal to or larger than the second threshold value and the number of vertices is less than 3, the estimation module 144 can determine that the medium is a medium larger than the card.

When the medium length is equal to or larger than the third threshold value and the number of vertices is less than 4, the estimation module 144 estimates that the shape of the medium is not the shape of the card.

Figure 11C:
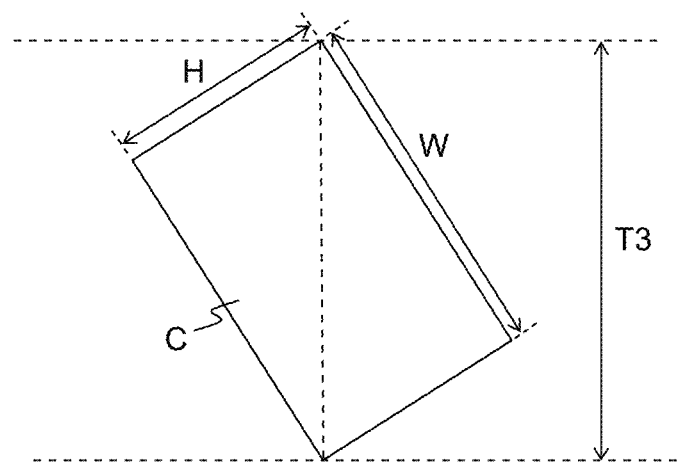
FIG. 11C is a schematic diagram for illustrating a third threshold value.

FIG. 11C is a schematic diagram for illustrating the third threshold.

As shown in FIG. 11C, the third threshold value is set to, for example, a number of pixels corresponding to a value (e.g., 102 mm) acquired by adding a margin to the length T3 (101.20 mm) of the diagonal X of the ID card C defined by ISO/IEC7810.

During conveying the ID card C, all other vertices V2-V4 pass through the imaging position before the ID card C is further conveyed by the distance T3 after the vertex V1 passes through the imaging position, no matter how the ID card C is tilted. Therefore, when the medium length is equal to or larger than the fourth threshold value and the number of vertices is not 4, the estimation module 144 can determine that the medium is a medium larger than the card.

When the medium length is less than the fourth threshold value and the number of vertices is 4, the estimation module 144 estimates that the shape of the medium is not the shape of the card.

Figure 11D:
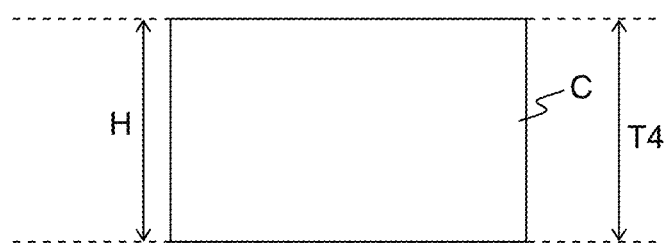
FIG. 11D is a schematic diagram for illustrating a fourth threshold value.

FIG. 11D is a schematic diagram for illustrating the fourth threshold.

As shown in FIG. 11D, the third threshold value is set to, for example, a number of pixels corresponding to a value (e.g., 53 mm) acquired by subtracting a margin from the length T4 (53.98 mm) of the short side H of the ID card C defined by ISO/IEC7810.

During conveying the ID card C, no other vertices V2-V4 pass through the imaging position before the ID card C is conveyed by the distance T4 after the vertex V1 passes through the imaging position, no matter how the ID card C is conveyed. Therefore, when the medium length is less than the fourth threshold value and the number of vertices is 4, the estimation module 144 can determine that the medium is a medium smaller than the card.

On the other hand, when the medium length is equal to or less than the second threshold value and the number of vertices is equal to or larger than 3, the estimation module 144 estimates that the shape of the medium is the shape of the card.

As shown in FIG. 11B, during conveying the ID card C, both the vertex V2 and the vertex V3 sharing the side with the vertex V1 always pass through the imaging position when the ID card C is further conveyed by the distance T2 after the vertex V1 passes through the imaging position, no matter how the ID card C is conveyed. Therefore, when the detected medium length is equal to or less than the second threshold value and the number of detected vertices is equal to or larger than 3, the estimation module 144 can determine that the medium is a medium having a size equivalent to the card or a medium smaller than the card. Generally, it is assumed that the medium is a card because it is unlikely that a medium smaller than the card will be conveyed.

On the other hand, when the above conditions are not satisfied and the number of vertices is 4, the estimation module 144 estimates that the shape of the medium is the shape of the card.

When all the vertices pass through the imaging position without satisfying the above conditions, the estimation module 144 can determine that the medium is a medium having a size equivalent to the card or a medium smaller than the card. Generally, it is assumed that the medium is a card because it is unlikely that a medium smaller than the card will be conveyed.

On the other hand, when the above conditions are not satisfied and the number of vertices is less than 4, the estimation module 144 determines that the shape of the medium cannot be estimated yet.

As described above, since the estimation module 144 estimates the shape of the medium based on the number of vertices and the medium length in the medium conveying direction, the estimation module 144 can estimate with high accuracy whether or not the medium is a card even when the medium is conveyed in an inclined manner. Further, since the estimation module 144 can estimate the shape of the medium without executing complicated image processing, the estimation module 144 can suppress an increase in the processing load of the shape estimation process. Further, since the estimation module 144 can estimate the shape of the medium in real time, for sequentially generated line images, the estimation module 144 can estimate the shape of the medium before the entire medium is imaged. In particular, since the estimation module 144 can estimate the shape of the medium at an early stage when the medium other than the card is conveyed, the control module 141 can execute a multi-feed determination process to be described later on the medium other than the card at an early stage. On the other hand, since the estimation module 144 does not estimate that the shape of the medium is the shape of the card until the characteristic peculiar to the card is detected, the estimation module 144 can prevent the medium from being erroneously estimated as a card even when a long document such as a receipt is conveyed toward the longitudinal direction.

Next, the estimation module 144 determines whether or not the second shape, that is, the outer shape of the medium, has been estimated as the shape of the medium (step S216). When the second shape has been estimated, the estimation module 144 ends series of steps.

On the other hand, when the second shape has not been estimated, the estimation module 144 determines whether or not the entire medium has been imaged, in the same manner as the process of the step S108 (step S217). When the entire medium has not been imaged, the estimation module 144 ends series of steps.

On the other hand, when the entire medium has been imaged, the estimation module 144 generates an input image by combining the selected line images acquired so far, and detects edge pixels from the generated input image (step S218). The estimation module 144 detects the left edge pixel and the right edge pixel from the input image in the same manner as the process of the step S202. Further, the estimation module 144 calculates, for each vertical line in the input image, an adjacent difference value between each pixel and the lower pixel of each pixel in order from the upper end of the input image, and detects the first pixel whose adjacent difference value is equal to or larger than the edge threshold as the upper edge pixel. Further, the estimation module 144, for each vertical line in the input image, calculates an adjacent difference value between each pixel and the upper pixel of each pixel in order from the lower end of the input image, and detects the first pixel whose adjacent difference value is equal to or larger than the edge threshold as the lower edge pixel. The estimation module 144 may calculate, for each vertical line in the input image, an adjacent difference value between each pixel and the lower pixel of each pixel in order from the upper end of the input image, and detect the last pixel whose adjacent difference value is equal to or larger than the edge threshold as the lower edge pixel.

Next, the estimation module 144 estimates the second shape of the medium, that is, the outer shape of the medium from the detected edge pixels (step S219), and ends series of steps. At first, the estimation module 144 detects a plurality of straight lines from the edge pixels. The estimation module 144 detects a straight line corresponding to the left side of the medium from the left edge pixel, detects a straight line corresponding to the right side of the medium from the right edge pixel, detects a straight line corresponding to the upper side of the medium from the upper edge pixel, and detects a straight line corresponding to the lower side of the medium from the lower edge pixel. The estimation module 144 detects a straight line using the least squares method. The estimation module 144 may detect the straight line by using the Hough transform.

Further, the estimation module 144 may detect a straight line except for the left edge pixels and the right edge pixels whose horizontal position is separated from a horizontal position of left edge pixel and right edge pixel adjacent in the vertical direction by a predetermined distance or more, among the left edge pixels and the right edge pixels. Similarly, the estimation module 144 may detect a straight line except for the upper edge pixels and the lower edge pixels whose vertical position is separated from a vertical position of upper edge pixel and the lower edge pixel in the horizontal direction by a predetermined distance or more, among the upper edge pixels and the lower edge pixels. Thus, when the medium is conveyed inclined, the estimation module 144 can detect straight lines so as not to be affected by the upper edges and lower edges of the medium detected as the left edge pixels and the right edge pixels, or the left edges and right edges of the medium detected as the upper edge pixels and the lower edge pixels.

Next, the estimation module 144 extracts, among the detected plurality of straight lines, four straight lines where each two of the extracted plurality of straight lines are substantially perpendicular to each other. The estimation module 144 first selects one straight line from straight lines corresponding to the left side of the document, and extracts a straight line substantially parallel (e.g., within ±3°) to the selected straight line from straight lines corresponding to the right side of the document. Next, the estimation module 144 extracts, among straight lines corresponding to the upper and lower sides of the medium, straight lines substantially perpendicular (e.g., within ±3° with respect to 90°) to the straight line selected from straight lines corresponding to the left side of the document, respectively. The estimation module 144 extracts four straight lines relating to a combination in which the area of the region surrounded by each straight line is the largest among the combinations of straight lines satisfying the above conditions. The estimation module 144 estimates the region formed by the extracted four straight lines as the outer shape of the medium.

The estimation module 144 may estimate the circumscribed rectangle of the area surrounded by the detected left edge pixels, right edge pixels, upper edge pixels and lower edge pixels as the outer shape of the medium.

Further, the estimation module 144 may estimate whether or not the shape of the medium is the shape of the card based on a size of the outer shape of the medium, instead of estimating whether or not the shape of the medium is the shape of the card based on the number of vertices and the medium length in the medium conveying direction. In that case, the estimation module 144 estimates the outer shape of the medium in the same manner as the process of the step S219, and estimates whether or not the shape of the medium is the shape of the card according to whether or not the difference between the size of the estimated outer shape of the medium and the size of the ID card is equal to or less than the threshold.

Thus, the estimation module 144 estimates the shape of the medium from the line image acquired by imaging the surface selected by the selection module 143. Thus, the estimation module 144 can estimate the shape of the medium from the line image in which the boundary between the medium and the backing member is clearly identified, and estimate the shape of the medium with high accuracy.

Figure 12:
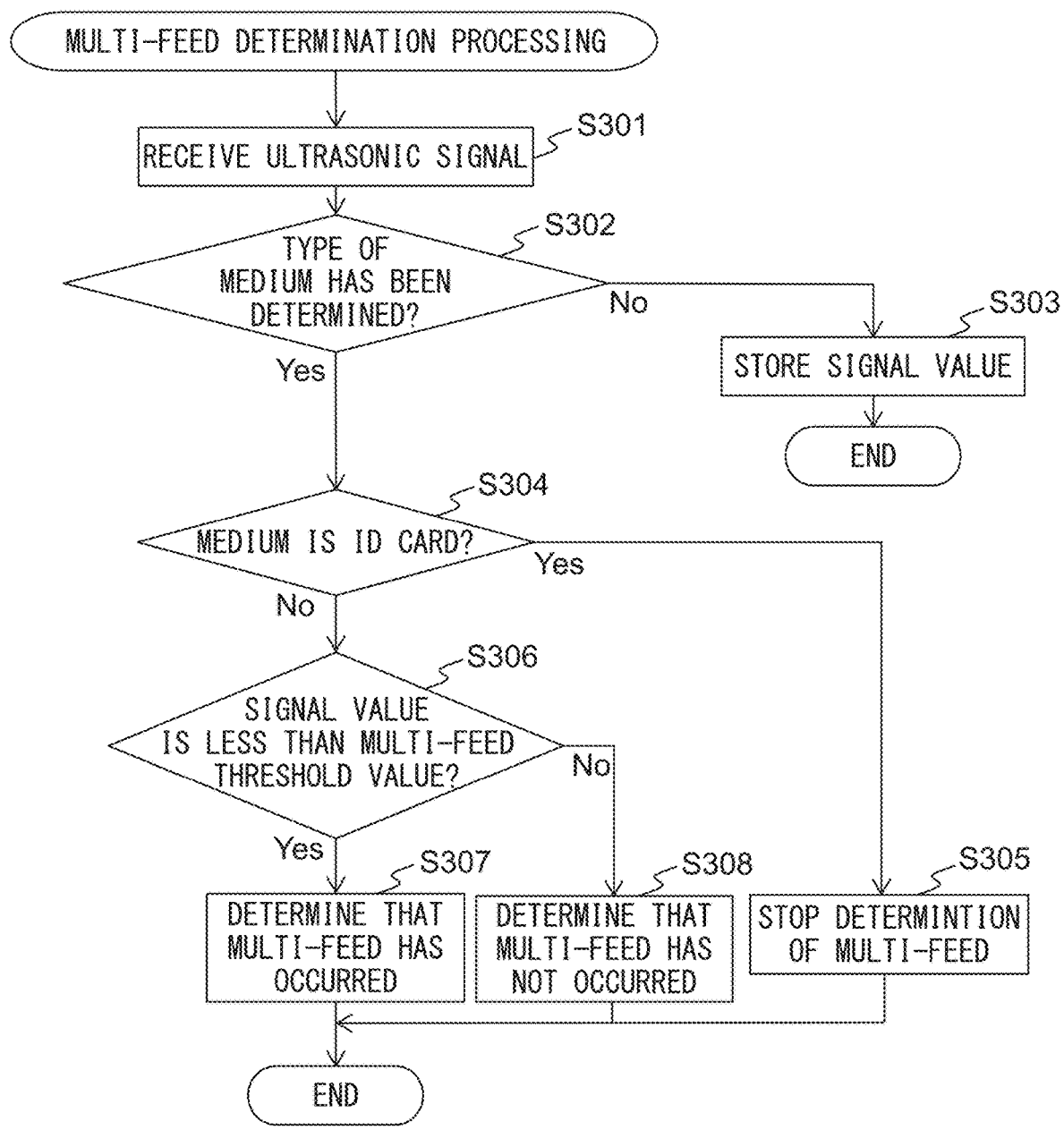
FIG. 12 is a flowchart illustrating the operation example of the multi-feed determination processing.

FIG. 12 is a flowchart illustrating an operation example of the multi-feed determination processing.

Referring to the flowchart illustrated in FIG. 8, an operation example of the multi-feed determination process in the medium conveying apparatus 100 will be described below. The operation flow described below is executed mainly by the processing circuit 140 in cooperation with each element in the medium transport apparatus 100 in accordance with a program previously stored in the storage device 130. The flowchart illustrated in FIG. 12 is periodically executed, after the control module 141 starts conveying the medium in the step S103 of FIG. 5.

First, the control module 141 acquires an ultrasonic signal from the ultrasonic sensor 114 (step S301).

Next, the control module 141 determines whether or not the first shape of the medium has been estimated, that is, whether or not the shape of the medium is the shape of the card has been estimated, in the shape estimation process (step S302).

When it has not been estimated whether or not the shape of the medium is the shape of the card, the control module 141 stores signal values of the acquired ultrasonic signal in the storage device 130 (step S303), and ends series of steps.

On the other hand, when it has been estimated whether or not the shape of the medium is the shape of the card, the control module 141 determines whether or not the shape of the medium is estimated to be the shape of the card (step S304).

When it is estimated that the shape of the medium is the shape of the card, the control module 141 stops determining whether or not multi-feed has occurred (step S305), and ends series of steps.

On the other hand, when it is estimated that the shape of the medium is not the shape of the card, the control module 141 determines whether or not each signal value of the ultrasonic signal acquired so far is less than the multi-feed threshold value (step S306).

Figure 13:
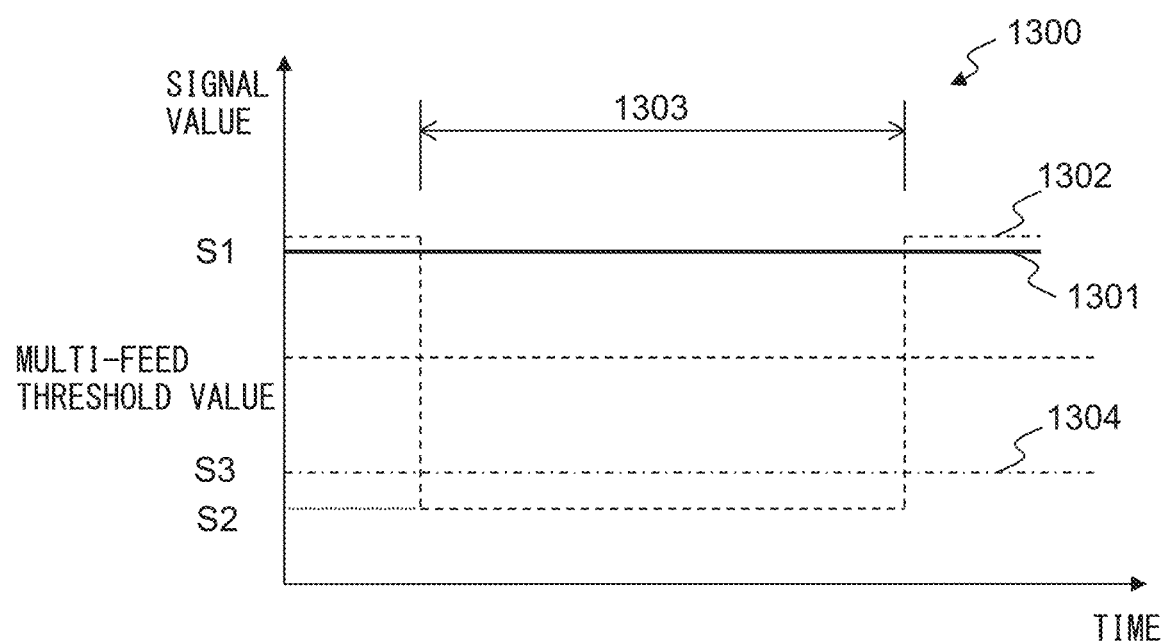
FIG. 13 is a schematic diagram for illustrating a characteristic of an ultrasonic signal.

FIG. 13 is a schematic diagram for illustrating a characteristic of an ultrasonic signal.

In a graph 1300 in FIG. 13, a solid line 1301 represents a characteristic of an ultrasonic signal when one sheet of paper is conveyed as a medium, and a dotted line 1302 represents a characteristic of an ultrasonic signal when multi-feed of paper is occurring. The horizontal axis of graph 1300 indicates time, and the vertical axis indicates a signal value of the ultrasound signal. Due to occurrence of multi-feed, a signal value of the ultrasonic signal in the dotted line 1302 declines in a section 1303. The multi-feed threshold value is set to a value between a signal value S1 of the ultrasonic signal when one sheet of paper is conveyed and a signal value S2 of the ultrasonic signal when multi-feed of paper is occurring. By determining whether or not a signal value of the ultrasonic signal is less than the multi-feed threshold value, the control module 141 can determine whether or not the multi-feed of the medium is occurring.

On the other hand, the one-dot chain line 1304 represents a characteristics of the ultrasonic signal when only one plastic card is conveyed. When the card is conveyed, since a signal value of the ultrasonic signal becomes less than the multi-feed threshold value, the control module 141 erroneously determines that multi-feed of the medium has occurred. In particular, a signal value of the ultrasonic signal when the multi-feed of thin paper is occurring is close to a signal value of the ultrasonic signal when the card is conveyed, and it is difficult to set the multi-feed threshold value to a value between the two signal values. However, when it is estimated that the medium is the card, the control module 141 stops detecting the multi-feed, and thus can prevent the detection error of the multi-feed of the medium.

The control module 141 determines that the multi-feed has occurred when any of signal values of the ultrasonic signal acquired so far is less than the multi-feed threshold value (step S307), and ends series of steps. In this case, the control module 141 determines that multi-feed of the medium has occurred in the step S106 of FIG. 5, and controls the conveying roller so as to stop conveying the medium in the step S107. On the other hand, the control module 141 determines that the multi-feed has not occurred when all of the signal values of the ultrasonic signal acquired so far is equal to or more than the multi-feed threshold value (step S308), and ends series of steps. Thus, the control module 141 determines whether or not multi-feed of the medium has occurred by comparing the ultrasonic signal with the multi-feed threshold value.

Further, the control module 141 stops determining whether or not multi-feed has occurred, according to whether or not the shape of the conveyed medium is the shape of the card. That is, the control module 141 controls the conveying roller based on the shape estimated by the estimation module 144.

The control module 141 may control the conveying roller so that the conveyance speed of the medium (motor rotation speed of the driving device 121) is different in accordance with the shape estimated by the estimation module 144. In that case, the control module 141 controls the conveyance speed when the conveyed medium is the card to be lower (slower) than the conveyance speed when the conveyed medium is not the card so that slippery plastic card is conveyed more stably.

Further, either of the control of the conveying roller or the cutting out of the medium image based on the shape estimated by the estimation module 144 may be omitted. When the cutting out of the medium image based on the estimated shape is omitted, the control module 141 detects the outer shape of the medium from each image acquired by imaging each surface of the medium, and cuts out the region of the detected outer shape from each image.

Further, the estimation module 144 may estimate the size (width and/or length) of the medium, the inclination of the conveyed medium, etc., as the shape of the medium from the line image acquired by imaging the surface of the medium selected by the selection module 143 using a known image processing technique. In this case, the control module 141 determines the size of the medium image to be cut out from the first line image and the second line image according to the estimated size of the medium, and cuts out the medium image. Alternatively, the control module 141 controls the conveying roller so that the conveyance speed of the medium becomes lower as the inclination of the conveyed medium becomes larger, and suppresses the inclination of the medium from becoming larger.

As described in detail above, the medium conveying apparatus 100 selects either surface from the line images acquired by imaging both surfaces of the medium, respectively, and estimates the shape of the medium from the line image acquired by imaging the selected surface. Thus, in the medium conveying apparatus 100 for imaging both surfaces of the medium, it is possible to select the surface of the medium for estimating the shape of the conveyed medium earlier.

In particular, when a medium having a different color between the front surface and the back surface is conveyed, the medium conveying apparatus 100 can suitably estimate the shape of the medium using a more appropriate surface.

Further, since the user does not need to set the multi-feed detection function to OFF in order to prevent the occurrence of the multi-feed of the medium from being erroneously detected when the medium conveying apparatus 100 conveys a card, the medium conveying apparatus 100 can improve the convenience of the user.

Further, since the medium conveying device 100 can determine whether or not the medium is a card without using a special sensor such as a thickness sensor, it is possible to suppress an increase in the apparatus cost.

Figure 14:
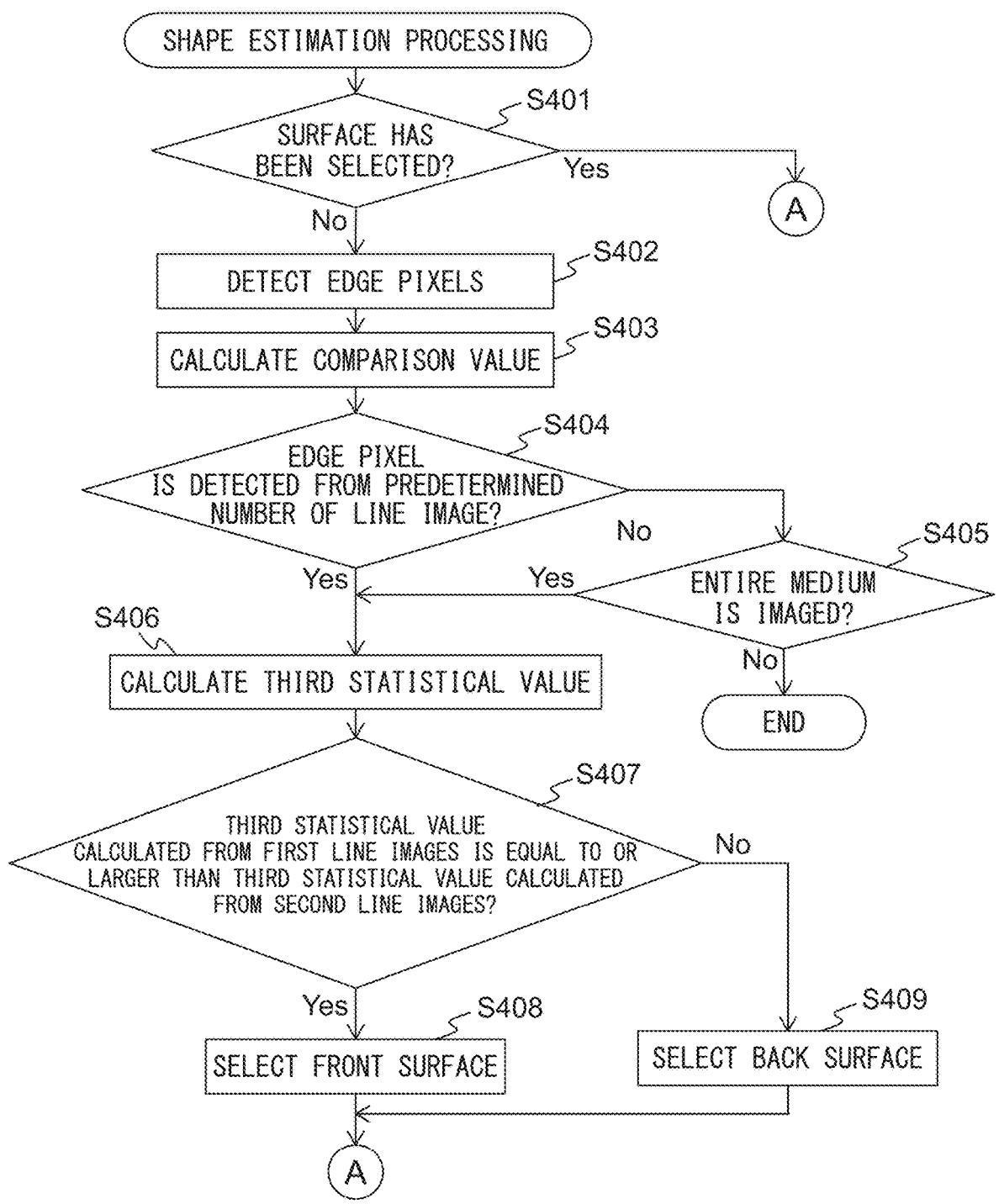
FIG. 14 is a flowchart illustrating another operation example of shape estimation processing.

FIG. 14 is a flowchart illustrating an example of part of an operation of the shape estimation processing according to another embodiment.

The shape estimation processing shown in FIG. 14 is executed instead of the shape estimation process shown in FIG. 6. Since the processing of steps S401 to S402 in FIG. 14 is similar to the processing of steps S201 to S202 in FIG. 6, detailed descriptions thereof will be omitted, and only the processing of steps S403 to S409 will be described below.

The selection module 143 calculates a comparison value acquired by comparing the gradation value of each of the edge pixels detected from each of the first line image and the second line image and the gradation value of a peripheral pixel of each of the detected edge pixels (step S403). The selection module 143 sets, as the peripheral pixel for each edge pixel, a pixel where the adjacent difference value between the pixel and each edge which was used when each edge pixel was detected, is equal to or larger than the edge threshold value. The selection module 143 calculates, for each of the first line image and the second line image, a first statistical value (average value, maximum value, minimum value, etc.) of an absolute value of a difference between the gradation value of each edge pixel included in each line image and the gradation value of the peripheral pixel of each edge pixel as the comparison value of each line image. Alternatively, the selection module 143 may calculate the first statistical value of the division value acquired by dividing the larger gradation value by the smaller gradation value among the gradation value of each edge pixel and the gradation value of the peripheral pixel of each edge pixel as the comparison value.

In the examples shown in the graphs 801 of the drawing 8A, the pixel X2 is set as the peripheral pixel of the edge pixel X1, and the pixel X4 is set as the peripheral pixel of the edge pixel X3. The larger the difference or ratio of the gradation value of the edge pixel X1 and the gradation value of the peripheral pixel X2, and the difference or ratio of the gradation value of the edge pixel X3 and the gradation value of the peripheral pixel X4 are, that is, the clearer the boundary between the medium M1 and the backing member B or the shadow N1 is, the larger the comparison value is.

Further, the selection module 143 may calculate the comparison value by comparing the gradation values of pixel group including the edge pixel and the gradation values of pixel group including the peripheral pixel. In that case, the selection module 143 extracts an edge pixel and pixels located within a predetermined distance (e.g., 5 pixels) from the edge pixel to the opposite side of the peripheral pixel as an edge pixel group. Further, the selection module 143 extracts a peripheral pixel and a pixel located within a predetermined distance from the peripheral pixel to the opposite side of the edge pixel as a peripheral pixel group. The selection module 143 calculates the absolute value of the difference between a second statistical value (average value, median value, mode value, maximum value, minimum value, etc.) of the gradation value of the pixels included in each edge pixel group and the second statistical value of the gradation value of the pixels included in each peripheral pixel group. Then, the selection module 143 calculates the first statistical value of the calculated absolute value as the comparison value of each line image. Alternatively, the selection module 143 calculates the first statistical value of the division value acquired by dividing the larger second statistical value by the smaller second statistical value among the second statistical value of the gradation value of the pixel included in each edge pixel group and the second statistical value of the gradation value of the pixel included in each peripheral pixel group as the comparison value.

In the examples shown in the graph 801 of the FIG. 8A, for the edge pixel X1, the pixel group G1 is set as the edge pixel group, and the pixel group G2 is set as the peripheral pixel group. Further, for the edge pixel X3, the pixel group G3 is set as the edge pixel group, and the pixel group G4 is set as the peripheral pixel group. Since the selection module 143 calculates the comparison value using the gradation values of a plurality of pixels, the selection module 143 can suppress the influence of noise etc., further improve the reliability of the comparison value.

Next, the selection module 143 determines whether or not each edge pixel is detected from a predetermined number or more of the first line image and a predetermined number or more of the second line image (step S404). The predetermined number is set to one or more. The selection module 143 can select a surface of the medium suitable for estimating the shape of the medium with higher accuracy by setting the predetermined number to two or more, particularly, to a large number. On the other hand, the selection module 143 can select the surface of the medium for estimating the shape of the medium in a short time, by setting the predetermined number to a small number.

When edge pixels have not been detected from the predetermined number or more of the first line image and the predetermined number or more of the second line image, the selection module 143 determines whether or not the entire medium has been imaged, in the same manner as the process of the step S108 (step S405). If the entire medium has not been imaged, the selection module 143 ends series of steps.

On the other hand, when edge pixels have been detected from the predetermined number or more of the first line images and the predetermined number or more of the second line images, or when the entire medium has been imaged, the selection module 143 calculates a third statistical value based on comparing the gradation value of the edge pixel and the gradation value of the peripheral pixel (step S406). The selection module 143 calculates the average value, the median value, the mode value, the maximum value or the minimum value of the comparison value calculated from each line image as the third statistical value.

When edge pixels have been detected from the predetermined number or more of the first line images and the second line images, the selection module 143 calculates the third statistical value of the comparison values calculated from the predetermined number of the first line images and the third statistical value of the comparison values calculated from the predetermined number of the second line images. On the other hand, when the entire medium has been imaged, the selection module 143 calculates the third statistical value of the comparison values calculated from the first line images in which the edge pixel has been detected so far and the third statistical value of the comparison values calculated from the second line images in which the edge pixel has been detected so far.

Next, the selection module 143 determines whether or not the third statistical value calculated from the first line images is equal to or larger than the third statistical value calculated from the second line images (step S407). When the third statistical value calculated from the first line images is equal to or larger than the third statistical value calculated from the second line images, the selection module 143 selects a surface (front surface) corresponding to the first line images as a surface for estimating the form of the medium (step S408), and ends series of steps. When the third statistical value calculated from the first line images is less than the third statistical value calculated from the second line images, the selection module 143 selects a surface (back surface) corresponding to the second line images as a surface for estimating the form of the medium (step S409), and ends series of steps. When the entire medium has been imaged, the selection module 143 may select a preset surface of the medium.

Thus, the selection module 143 calculates the third statistical value based on the comparison between the gradation value of each edge pixel detected from each of a predetermined number of first line images and a predetermined number of second line images and the gradation value of the peripheral pixel of each edge pixel. The selection module 143 selects either surface of the first surface or the second surface of the medium as a surface for estimating the shape of the medium, based on the calculated third statistical value. That is, the selection module 143 selects either surface of the first surface or the second surface of the medium based on the comparison between the gradation value of the detected edge pixel and the gradation value of the peripheral pixel of the edge pixel.

Thus, the selection module 143 can select a surface on which a boundary (contrast) between the medium and the backing member is more clearly identified. Further, since the selection module 143 can select the surface of the medium without performing complicated image processing, the selection module 143 can suppress an increase in the processing load of the shape estimation processing. Further, since the selection module 143 selects the surface of the medium in real time for the sequentially generated line image, the selection module 143 can select the surface of the medium before the entire medium is imaged, as a result, reduce the processing load of the shape estimation process and reduce the use of resources such as memory. Further, since the selection module 143 selects the surface of the medium early, the estimation module 144 can estimate the shape of the medium, in particular the first shape, early.

As described in detail above, the medium conveying device 100 can select the surface of the medium earlier even when selecting the surface of the medium for estimating the shape of the medium based on the comparison between the gradation value of the edge pixel and the gradation value of the peripheral pixel.

Figure 15:
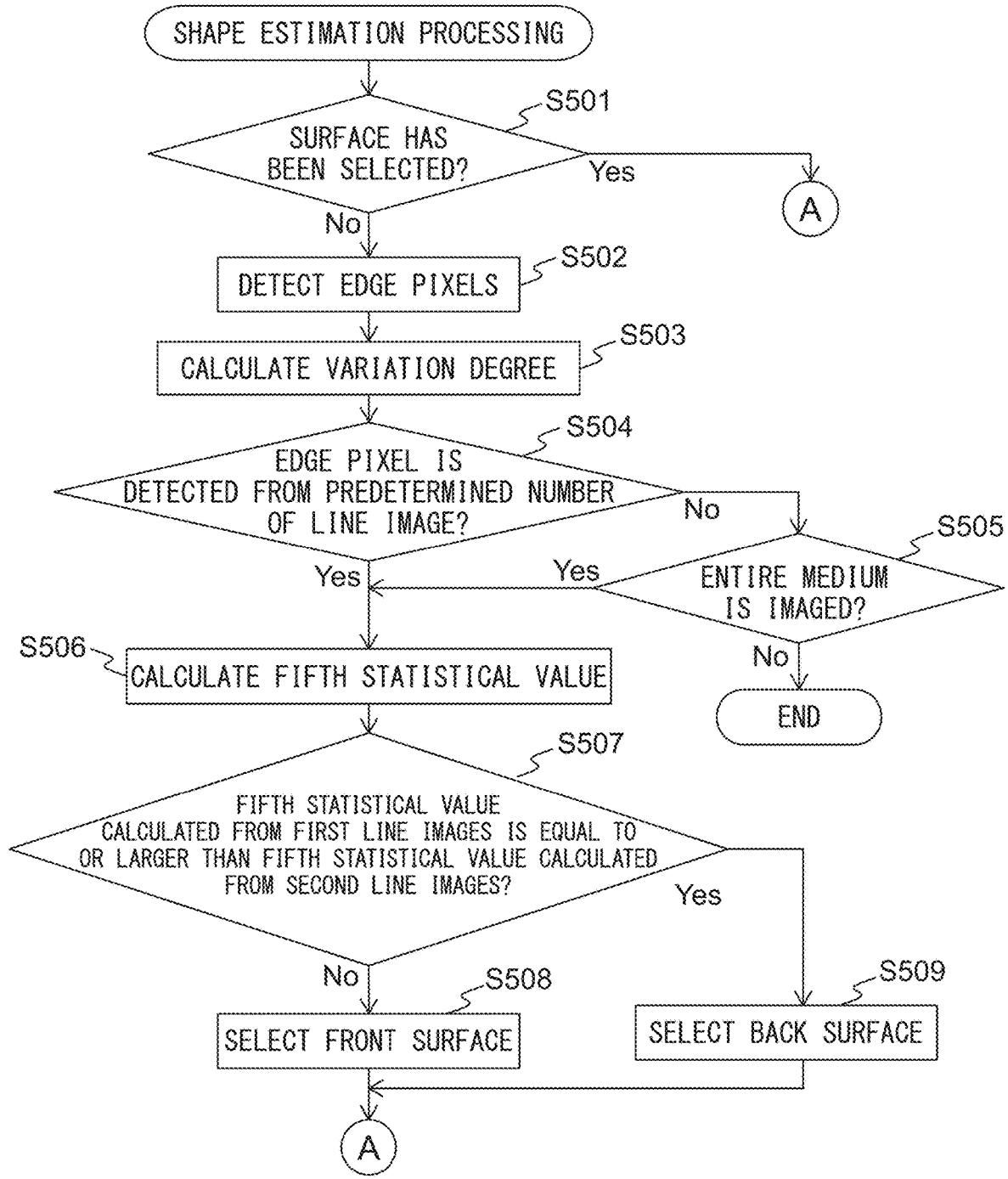
FIG. 15 is a flowchart illustrating still another operation example of shape estimation processing.

FIG. 15 is a flowchart illustrating an example of an operation of the shape estimation processing according to still another embodiment.

The shape estimation processing shown in FIG. 15 is executed instead of the shape estimation process shown in FIG. 6. Since the processing of steps S501 to S502 in FIG. 15 is similar to the processing of steps S201 to S202 in FIG. 6, detailed descriptions thereof will be omitted, and only the processing of steps S503 to S509 will be described below.

The selection module 143 calculates a variation degree of the gradation values of pixels within a predetermined distance from each of the edge pixels detected from each of the first line image and the second line image and/or the variation degree of the gradation values of pixels within a predetermined distance from the peripheral pixel of each of the detected edge pixels (step S503). The selection module 143 extracts the peripheral pixel, the edge pixel group, and the peripheral pixel group in the same manner as the process of the step S403 of FIG. 14.

The selection module 143 extracts, among pixels included in the edge pixel group, pixels having a gradation value of a predetermined range centered on the gradation value of the edge pixel, that is, a gradation value in which difference from the gradation value of the edge pixel is equal to or less than a predetermined threshold value. Further, the selection module 143 extracts, among pixels included in the peripheral pixel group, pixels having a gradation value in a predetermined range centered on the gradation value of the peripheral pixel, that is, a gradation value in which difference from the gradation value of the peripheral pixel is equal to or less than a predetermined threshold value.

The selection module 143 calculates, for each of the first line image and the second line image, an inverse of a fourth statistical value of the number of pixels extracted from each edge pixel group and/or each peripheral pixel group in each line image as the variation degree of each line image. The fourth statistic is the average value, the median value, the mode value, the minimum value or the maximum value. The selection module 143 may calculate a subtraction value acquired by subtracting the fourth statistical value from the upper limit value as the variation degree. Further, the selection module 143 may calculate an inverse of the fourth statistical value of the number of the pixels (pixels adjacent to each other) successively extracted from the edge pixel or the peripheral pixel in each edge pixel group and/or each peripheral pixel group as the variation degree. Further, the selection module 143 may calculate a subtraction value acquired by subtracting the fourth statistical value from the upper limit value as the variation degree. Further, the selection module 143 may calculate the fourth statistical value of the variance of the gradation value of each pixel included in each edge pixel group and/or each peripheral pixel group as the variation degree. Further, the selection module 143 may calculate the fourth statistical value of the subtraction value acquired by subtracting the minimum value from the maximum value of the gradation value of each pixel included in each edge pixel group and/or each peripheral pixel group, or the fourth statistical value of the division value acquired by dividing the subtraction value by the average value of each pixel as the variation degree.

In the example shown in the graph 801 of FIG. 8A, in the pixel groups G1 to G4, the variation degree is calculated so that the larger the variation in the gradation value of each pixel in each pixel group is, the larger the variation degree is, and the smaller the variation is, the smaller the variation degree is.

Next, the selection module 143 determines whether or not each edge pixel is detected from the predetermined number or more of the first line image and the predetermined number or more of the second line image (step S504).

When edge pixels have not been detected from the predetermined number or more of the first line image and the predetermined number or more of the second line image, the selection module 143 determines whether or not the entire medium has been imaged, in the same manner as the process of the step S108 (step S505). When the entire medium has not been imaged, the selection module 143 ends series of steps.

On the other hand, when edge pixels have been detected from the predetermined number or more of the first line images and the predetermined number or more of the second line images, or when the entire medium has been imaged, the selection module 143 calculates a fifth statistical value based on the variation in the gradation values of pixels within a predetermined distance from the edge pixel or the peripheral pixel (step S506). The selection module 143 calculates, as the fifth statistical value, the average value, the median value, the mode value, the maximum value or the minimum value of the variation degree in the gradation values of the pixels within the predetermined distance from the edge pixels or the peripheral pixels.

When edge pixels have been detected from the predetermined number or more of the first line images and the predetermined number or more of the second line image, the selection module 143 calculates the fifth statistical value of the variation degree calculated from the predetermined number of the first line images and the fifth statistical value of the variation degree calculated from the predetermined number of the second line images. On the other hand, when the entire medium has been imaged, the selection module 143 calculates the fifth statistical value of the variation degree calculated from first line images in which an edge pixel has been detected so far, and the fifth statistical value of the variation degree calculated from second line images in which an edge pixel has been detected so far.

Next, the selection module 143 determines whether or not the fifth statistical value calculated from the first line image is equal to or larger than the fifth statistical value calculated from the second line image (step S507). When the fifth statistical value calculated from the first line image is less than the fifth statistical value calculated from the second line image, the selection module 143 selects a surface (front surface) corresponding to the first line image as a surface for estimating the form of the medium (step S508), and ends series of steps. When the fifth statistical value calculated from the first line image is equal to or larger than the fifth statistical value calculated from the second line image, the selection module 143 selects a surface (back surface) corresponding to the second line image as a surface for estimating the shape of the medium (step S509), and ends series of steps. When the entire medium has been imaged, the selection module 143 may select a preset surface of the medium.

Thus, the selection module 143 calculates a statistical value based on the variation in the gradation values of the pixels within the predetermined distance from each edge pixel detected from each of a predetermined number of the first line images and a predetermined number of the second line images or the peripheral pixel of each edge pixel. Then, the selection module 143 selects either surface of the first surface or the second surface of the medium as a surface for estimating the shape of the medium, based on the calculated statistical value. That is, the selection module 143 selects either surface of the first surface or the second surface of the medium based on the variation of the gradation values of the pixels within the predetermined distance from the detected edge pixel or the peripheral pixel of the edge pixel.

Thus, the selection module 143 can select a surface having a smaller contrasting density (unevenness, noise) of the area on the medium side and/or the area on the backing member side around the boundary between the medium and the backing member, and the estimating module 144 can estimate the shape of the medium more stably. Further, since the selection module 143 can select the surface of the medium without performing complicated image processing, the selection module 143 can suppress an increase in the processing load of the shape estimation processing. Further, since the selection module 143 selects the surface of the medium in real time for the sequentially generated line image, the selection module 143 can select the surface of the medium before the entire medium is imaged, as a result, reduce the processing load of the shape estimation process and reduce the use of resources such as memory. Further, since the selection module 143 selects the surface of the medium early, the estimation module 144 can estimate the shape of the medium, in particular the first shape, early.

As described in detail above, the medium conveying device 100 can select the surface of the medium earlier even when selecting the surface of the medium for estimating the shape of the medium based on the variation of the gradation values of the pixels within the predetermined distance from the edge pixel or the peripheral pixel.

Figure 16:
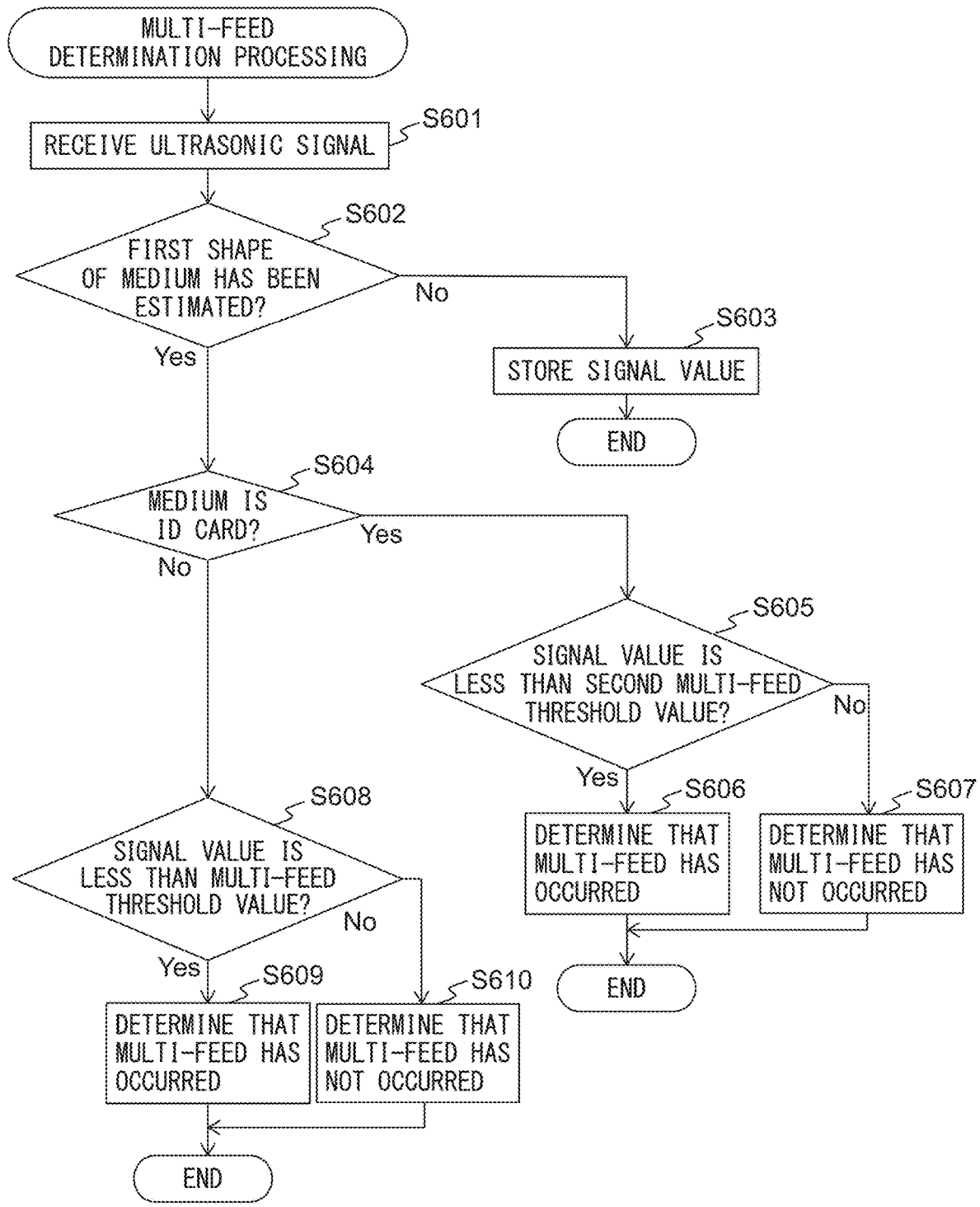
FIG. 16 is a flowchart illustrating another operation example of the multi-feed determination processing.

FIG. 16 is a flowchart illustrating an example of a part of an operation of the multi-feed determination process according to another embodiment.

The multi-feed determination processing shown in FIG. 16 is executed instead of the multi-feed determination processing shown in FIG. 12. Since the processing of steps S601 to S604, S608 to S610 in FIG. 16 is similar to the processing of steps S301 to S304, S306 to S308 in FIG. 8, detailed descriptions thereof will be omitted, and only the processing of steps S605 to S607 will be described below.

In the step S604, when it is determined that the shape of the medium is the shape of the card, the control module 141 determines whether or not each signal value of the ultrasonic signal acquired so far is less than the second multi-feed threshold value (step S605). The second multi-feed threshold value is set to a value between the signal value S3 of the ultrasonic signal when the card shown in FIG. 13 is conveyed and the signal value S2 of the ultrasonic signal when the multi-feed of the paper is occurring so that it can be determined whether the card is conveyed or the multi-feed of the paper is occurring. To prevent the occurrence of detection error of multi-feed, it is preferable that the multi-feed threshold value used when the card is not conveyed is set to a value sufficiently larger than the signal value S2 of the ultrasonic signal when the multi-feed of the paper is occurring. Therefore, the multi-feed threshold value is set to a value larger than the signal value S3 of the ultrasonic signal when the card is conveyed. That is, the second multi-feed threshold value when the shape of the medium is the shape of the card is set to a value less than the multi-feed threshold value when the shape of the medium is not the shape of the card.

When any of the signal values of the ultrasonic signal acquired so far is less than the second multi-feed threshold value, the control module 141 determines that the multi-feed has occurred (step S606), and ends series of steps. In this case, the control module 141 determines that multi-feed of the medium has occurred in the step S106 of FIG. 5, and controls the conveying roller to stop conveying the medium in the step S107. On the other hand, when all of the signal values of the ultrasonic signal acquired so far is equal to or larger than the second multi-feed threshold value, the control module 141 determines that the multi-feed has not occurred (step S607), and ends series of steps. In this manner, the control module 141 changes the multi-feed threshold value for determining whether or not multi-feed has occurred, according to whether or not the shape of the conveyed medium is the shape of the card.

As described in detail above, the medium conveying apparatus 100 can select the surface of the medium for estimating the shape of the medium earlier, and suitably control the conveying roller even when the medium conveying apparatus 100 changes the multi-feed threshold value depending on whether or not the shape of the medium is the shape of the card.

The medium conveying apparatus 100 may execute not only one of the selection processing of the surface of the medium shown in steps S203 to S209 of FIG. 6, steps S403 to S409 of FIG. 14, and steps S503 to S509 of FIG. 15, but also two or more combinations.

In that case, the selection module 143 calculates a first evaluation value of each line image so that the larger the number of edge pixels detected from each line image is, the higher the first evaluation value is. Further, the selection module 143 calculates a second evaluation value of each line image so that the larger the comparison value calculated for each line image is, the higher the second evaluation value is. Further, the selection module 143 calculates a third evaluation value of each line image so that the smaller the variation degree calculated for each line image is, the higher the third evaluation value is. The selection module 143 calculates the sum, product, or weighted sum of two or more evaluation values among the first evaluation value, the second evaluation value, and the third evaluation value as an evaluation value, and selects a surface corresponding to the line image having the larger evaluation value. Thus, the selection module 143 can select a surface more suitable for estimating the shape of the medium.

Figure 17:
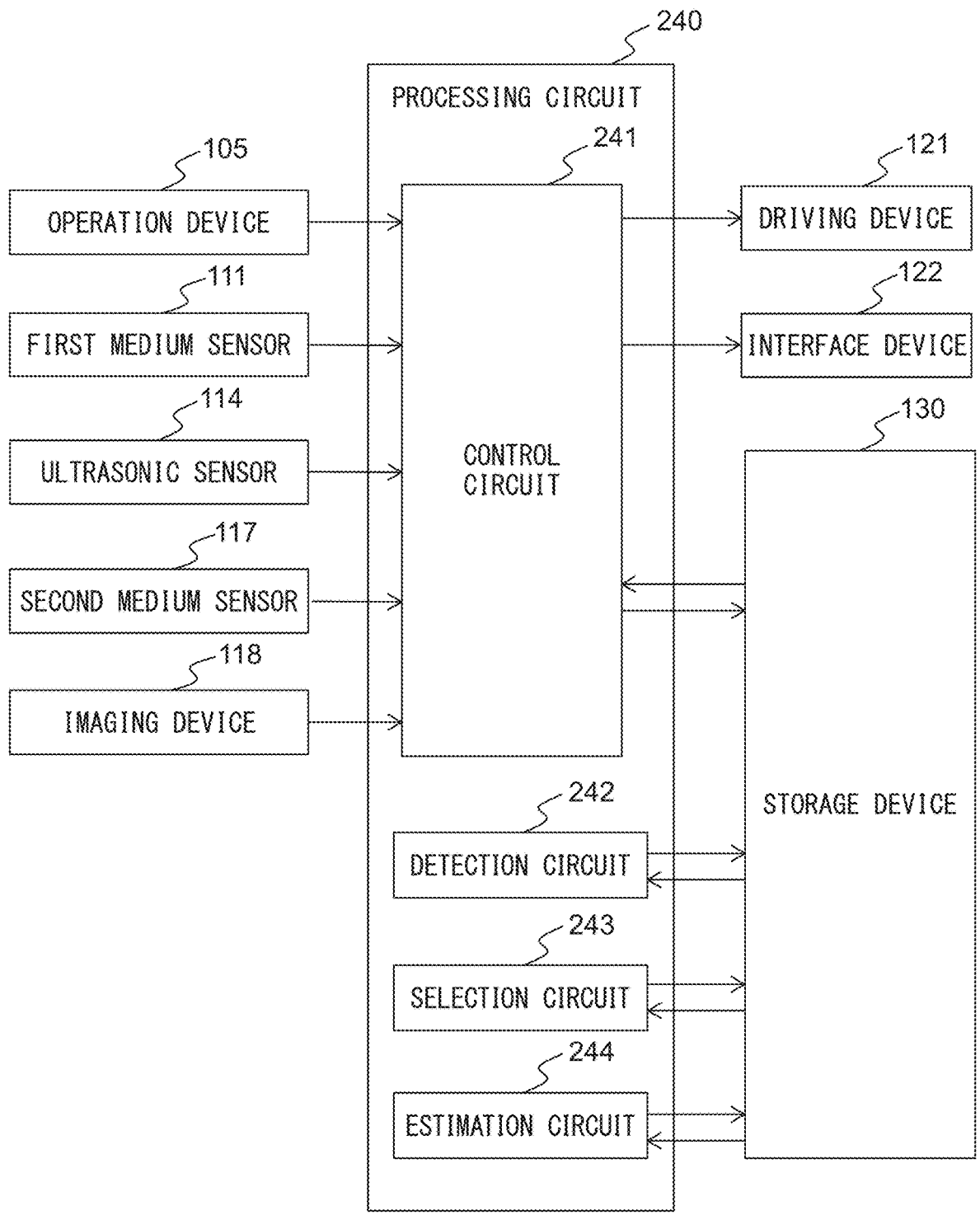
FIG. 17 is a diagram illustrating a schematic configuration of a processing circuit 240 in another medium conveying apparatus.

FIG. 17 is a diagram illustrating a schematic configuration of a processing circuit 240 in a medium conveying apparatus according to still another embodiment. The processing circuit 240 is used in place of the processing circuit 140 of the medium conveying apparatus 100 and includes a control circuit 241, a detection circuit 242, a selection circuit 243 and an estimation circuit 244, etc.

Note that each unit included in the processing circuit may be configured by an independent integrated circuit, a microprocessor, firmware, etc. In addition, a part of the processing circuit may be composed of a circuit, and a part of the processing circuit may be composed of a functional module implemented by software running on a processor.

The control circuit 241 is an example of a control module, and has a functions similar to the control module 141. The control circuit 241 receives an operation signal from the operating device 105, a first medium signal from the first medium sensor 111, and a second medium signal from the second medium sensor 117, and drives the driving device 121 to control the conveying roller in response to each received signal. The control circuit 241 receives line images from the imaging device 118 and stores the line images in the storage device 130. The control circuit 241 reads out the estimation result of the shape of the medium from the storage device 130, cuts out the medium image from each line image based on the estimation result, and outputs the medium image to an information processing apparatus (not shown) via the interface device 122. Further, the control circuit 241 receives an ultrasonic signal from the ultrasonic sensor 114, determines whether or not multi-feed of the medium has occurred based on the ultrasonic signal, and controls the conveying roller to stop conveying the medium when it is determined that multi-feed of the medium has occurred. The control circuit 241 reads out the estimation result of the shape of the medium from the storage device 130, and controls the conveying roller based on the estimation result.

The detection circuit 242 is an example of a detection module, and has a functions similar to the detection module 142. The detection circuit 242 reads out each line image from the storage device 130, detects edge pixels from each line image, and stores the detection result in the storage device 130.

The selection circuit 243 is an example of a selection module, and has a functions similar to the selection module 143. The selection circuit 243 reads out the detection result of the edge pixel from the storage device 130, selects a surface of the medium for estimating the shape of the medium based on the edge pixel, and stores the selection result in the storage device 130.

The estimation circuit 244 is an example of an estimation module, and has a functions similar to the estimation module 144. The estimation circuit 244 reads out the selection result of the surface of the medium, reads out the line image acquired by imaging the selected surface, estimates the shape of the medium based on the read out line image, and stores the estimation result in the storage device 130.

As described in detail above, even when the processing circuit 240 is used, the medium conveying apparatus can select the surface of the conveyed medium for estimating the shape of the medium earlier.

According to this embodiment, the medium conveying apparatus, the method, and the computer-readable, non-transitory medium storing the control program can select a surface of a conveyed medium for estimating a shape of the medium earlier in the medium conveying apparatus for imaging both surfaces of the medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A medium conveying apparatus comprising:
   a conveying roller to convey a medium;
   a first imaging device to generate a first line image acquired by imaging a first surface of the medium conveyed by the conveying roller;
   a second imaging device to generate a second line image acquired by imaging a second surface of the medium conveyed by the conveying roller; and a processor to
 detect edge pixels from the first line image and the second line image,
 select the first surface or the second surface of the medium, based on the number of the detected edge pixels, a comparison between a gradation value of each of the detected edge pixels and a gradation value of a peripheral pixel of said each of the detected edge pixels, or a variation of gradation values of pixels within a predetermined distance from said each of the detected edge pixels or the peripheral pixel of said each of the detected edge pixels,
 estimate a shape of the medium based on a line image acquired by imaging the selected surface, and
 control the conveying roller or cut out a medium image from the first line image and the second line image and output the medium image, based on the estimated shape.

2. The medium conveying apparatus according to claim 1, wherein the processor
 counts the number of the detected edge pixels each time the first line image and the second line image are generated, and
 selects the first surface or the second surface that corresponds to a line image a counted number of which exceeds a predetermined threshold.

3. The medium conveying apparatus according to claim 1, wherein the processor
 calculates a statistical value based on a comparison between the gradation value of said each detected edge pixel from each of a predetermined number of first line images and each of a predetermined number of second line images and a gradation value of a peripheral pixel of each edge pixel, and
 selects the first surface or the second surface based on the calculated statistical value.

4. The medium conveying apparatus according to claim 1, wherein the processor
 calculates a statistical value based on variation in gradation values of pixels within a predetermined distance from each edge pixel detected from each of a predetermined number of first line images and a predetermined number of second line images or a peripheral pixel of each edge pixel, and
 selects the first surface or the second surface based on the calculated statistical value.

5. The medium conveying apparatus according to claim 1, wherein the processor estimates whether the shape of the medium is a shape of a card.

6. The medium conveying apparatus according to claim 5, further comprising an ultrasonic sensor including an ultrasonic transmitter for transmitting an ultrasonic wave and an ultrasonic receiver facing the ultrasonic transmitter for receiving the ultrasonic wave and generating an ultrasonic signal corresponding to the received ultrasonic wave, wherein the processor
 determines whether multi-feed of the medium has occurred by comparing the ultrasonic signal with a threshold value,
 controls the conveying roller to stop conveying the medium when the processor determines that multi-feed of the medium has occurred, and
 changes the threshold value or stops determining whether multi-feed has occurred, according to whether the shape of the conveyed medium is the shape of the card.

7. A method for estimating a shape of a conveyed medium, comprising:
 conveying a medium by a conveyance roller;
 generating a first line image acquired by a first imaging device by imaging a first surface of the medium conveyed by the conveying roller;
 generating a second line image acquired by a second imaging device by imaging a second surface of the medium conveyed by the conveying roller;
 detecting edge pixels from the first line image and the second line image;
 selecting the first surface or the second surface of the medium, based on the number of the detected edge pixels, a comparison between a gradation value of each of the detected edge pixels and a gradation value of a peripheral pixel of said each of the detected edge pixels, or a variation of gradation values of pixels within a predetermined distance from said each of the detected edge pixels or the peripheral pixel of said each of the detected edge pixels;
 estimating a shape of the medium based on a line image acquired by imaging the selected surface; and
 controlling the conveying roller or cutting out a medium image from the first line image and the second line image and outputting the medium image, based on the estimated shape.

8. The method according to claim 7, further comprising counting the number of the detected edge pixels each time the first line image and the second line image are generated, wherein
 the first surface or the second surface that corresponds to a line image a counted number of which exceeds a predetermined threshold, is selected.

9. The method according to claim 7, further comprising calculating a statistical value based on a comparison between the gradation value of said each detected edge pixel from each of a predetermined number of first line images and each of a predetermined number of second line images and a gradation value of a peripheral pixel of each edge pixel, wherein
 the first surface or the second surface is selected based on the calculated statistical value.

10. The method according to claim 7, further comprising calculating a statistical value based on variation in gradation values of pixels within a predetermined distance from each edge pixel detected from each of a predetermined number of first line images and a predetermined number of second line images or a peripheral pixel of each edge pixel, wherein
 the first surface or the second surface is selected based on the calculated statistical value.

11. The method according to claim 7, wherein whether the shape of the medium is a shape of a card is estimated.

12. The method according to claim 11, further comprising:
 transmitting an ultrasonic wave by an ultrasonic transmitter;
 receiving the ultrasonic wave and generating an ultrasonic signal corresponding to the received ultrasonic wave by an ultrasonic receiver facing the ultrasonic transmitter;
 determining whether multi-feed of the medium has occurred by comparing the ultrasonic signal with a threshold value;
 controlling the conveying roller to stop conveying the medium when it is determined that multi-feed of the medium has occurred; and changing the threshold value or stopping determining whether multi-feed has occurred, according to whether the shape of the conveyed medium is the shape of the card.

13. A computer-readable, non-transitory medium storing a computer program, wherein the computer program causes a medium conveying apparatus including a conveying roller to convey a medium, a first imaging device to generate a first line image acquired by imaging a first surface of the medium conveyed by the conveying roller, and a second imaging device to generate a second line image acquired by imaging a second surface of the medium conveyed by the conveying roller, to execute a process, the process comprising:
    detecting edge pixels from the first line image and the second line image;
    selecting the first surface or the second surface of the medium, based on the number of the detected edge pixels, a comparison between a gradation value of each of the detected edge pixels and a gradation value of a peripheral pixel of said each of the detected edge pixels, or a variation of gradation values of pixels within a predetermined distance from said each of the detected edge pixels or the peripheral pixel of said each of the detected edge pixels;
    estimating a shape of the medium based on a line image acquired by imaging the selected surface; and
    controlling the conveying roller or cutting out a medium image from the first line image and the second line image and outputting the medium image, based on the estimated shape.

14. The computer-readable, non-transitory medium according to claim 13, the process further comprising counting the number of the detected edge pixels each time the first line image and the second line image are generated, wherein
    the first surface or the second surface that corresponds to a line image a counted number of which exceeds a predetermined threshold, is selected.

15. The computer-readable, non-transitory medium according to claim 13, the process further comprising calculating a statistical value based on a comparison between the gradation value of said each detected edge pixel from each of a predetermined number of first line images and each of a predetermined number of second line images and a gradation value of a peripheral pixel of each edge pixel, wherein
    the first surface or the second surface is selected based on the calculated statistical value.

16. The computer-readable, non-transitory medium according to claim 13, the process further comprising calculating a statistical value based on variation in gradation values of pixels within a predetermined distance from each edge pixel detected from each of a predetermined number of first line images and a predetermined number of second line images or a peripheral pixel of each edge pixel, wherein
    the first surface or the second surface is selected based on the calculated statistical value.

17. The computer-readable, non-transitory medium according to claim 13, wherein whether the shape of the medium is a shape of a card is estimated.

18. The computer-readable, non-transitory medium according to claim 17, wherein the medium conveying apparatus further includes an ultrasonic sensor having an ultrasonic transmitter for transmitting an ultrasonic wave and an ultrasonic receiver facing the ultrasonic transmitter for receiving the ultrasonic wave and generating an ultrasonic signal corresponding to the received ultrasonic wave, the process further comprising:
    determining whether multi-feed of the medium has occurred by comparing the ultrasonic signal with a threshold value;
    controlling the conveying roller to stop conveying the medium when it is determined that multi-feed of the medium has occurred; and
    changing the threshold value or stopping determining whether multi-feed has occurred, according to whether the shape of the conveyed medium is the shape of the card.

* * * * *